(12) United States Patent
Jacob et al.

(10) Patent No.: US 6,546,889 B1
(45) Date of Patent: Apr. 15, 2003

(54) STEERING SYSTEM

(75) Inventors: William V. Jacob, Brown Deer, WI (US); James A. Buckley, Whitefish Bay, WI (US)

(73) Assignee: Hayes Brake, L.L.C., Mequon, WI (US)

(*) Notice: Subject to any disclaimer, the term of this patent is extended or adjusted under 35 U.S.C. 154(b) by 0 days.

(21) Appl. No.: 09/943,331

(22) Filed: Aug. 30, 2001

(51) Int. Cl.$^7$ ............................................. B63H 25/00
(52) U.S. Cl. ..................... 114/144 R; 74/498
(58) Field of Search ................... 114/144 E, 144 R; 192/223.4; 180/364, 369, 400, 427, 431, 446; 74/498, 500

(56) References Cited

U.S. PATENT DOCUMENTS

| | | | | | |
|---|---|---|---|---|---|
| 1,352,868 A | * | 9/1920 | Blomstrom | ................. | 74/498 |
| 1,364,243 A | * | 1/1921 | Caldwell | ..................... | 74/498 |
| 1,403,318 A | | 1/1922 | Hansen | | |
| 1,425,678 A | * | 8/1922 | Newhouse | .................. | 475/300 |
| 1,630,046 A | * | 5/1927 | Anthony et al. | .............. | 74/498 |
| 1,637,847 A | * | 8/1927 | Baker | .......................... | 74/498 |
| 1,672,334 A | * | 6/1928 | Monsen | ......................... | 475/3 |
| 1,715,077 A | | 5/1929 | Tenney et al. | | |
| 1,909,330 A | | 5/1933 | Banker | | |
| 2,522,694 A | * | 9/1950 | Vogel | .......................... | 475/157 |
| 2,533,973 A | * | 12/1950 | Starkey | ..................... | 192/56.2 |
| 2,598,993 A | | 6/1952 | Gorske | .......................... | 192/8 |
| 2,819,777 A | | 1/1958 | Kosch | ........................... | 192/8 |
| 2,819,778 A | | 1/1958 | Kosch | ........................... | 192/8 |
| 2,927,551 A | | 3/1960 | Bevis et al. | | |
| 2,947,278 A | | 8/1960 | Magill et al. | | |
| 2,968,189 A | * | 1/1961 | Walko | ......................... | 74/498 |
| 3,087,587 A | | 4/1963 | Flieg | .......................... | 192/26 |
| 3,206,998 A | * | 9/1965 | Matz, Jr. et al. | ......... | 114/144 R |
| 3,225,620 A | | 12/1965 | Dubin | ......................... | 74/500 |
| 3,365,977 A | * | 1/1968 | Trocme | ....................... | 74/498 |
| 3,583,516 A | * | 6/1971 | Spanjer et al. | ................. | 74/498 |
| 3,796,292 A | | 3/1974 | Harrison | ..................... | 192/8 C |
| 3,823,617 A | | 7/1974 | Infanger et al. | .............. | 74/498 |
| 4,120,258 A | | 10/1978 | Spurgin | .................. | 114/144 E |
| 4,449,420 A | * | 5/1984 | Baba | ........................ | 114/144 R |
| 4,513,680 A | * | 4/1985 | Teraura | .................. | 114/144 R |
| 4,519,334 A | | 5/1985 | Knudson | ................ | 114/144 R |
| 4,531,427 A | * | 7/1985 | Nilsson | ........................ | 74/498 |
| 4,531,921 A | * | 7/1985 | Teraura et al. | .......... | 114/144 R |
| 4,557,695 A | | 12/1985 | Neisen | ......................... | 440/53 |
| 4,658,927 A | | 4/1987 | Kanazawa | .................. | 180/142 |
| 4,705,130 A | | 11/1987 | Fukunaga et al. | .......... | 180/140 |
| 4,932,492 A | | 6/1990 | Sauvageot et al. | ......... | 180/79.1 |

(List continued on next page.)

Primary Examiner—Stephen Avila
Assistant Examiner—Lars A. Olson
(74) Attorney, Agent, or Firm—Boyle Fredrickson Newholm Stein & Gratz S.C.

(57) ABSTRACT

A steering transmission transmits steering forces that must be transmitted from a steering mechanism, such as a steering wheel or handlebars, to a steered mechanism, such as the rudder of a boat or the steered wheel(s) of an off-road vehicle. The steering transmission includes one and preferably both of a multi-ratio speed changer and a torque gate. The multi-ratio speed changer preferably takes the form of one or more planetary gear sets coupling an input shaft of the transmission to a rotary output of the transmission. The speed changer is shifted by manually operating a shifter to switch between two or more distinct speed change ratios, thereby permitting the operator to select the combination of responsiveness and steering effort desired for the prevailing operating conditions. The torque gate preferably takes the form of a release driver, a locking driver, and a wrapped spring disposed between the release driver and the locking driver. The spring moves relative to a housing or other stationary surface upon the transmission of steering forces to the clutch from the steering mechanism but grips the stationary surface upon the imposition of external backdrive forces on the steering system so as to prevent the transmission of those forces back to the steering wheel and other upstream components of the steering system.

47 Claims, 13 Drawing Sheets

U.S. PATENT DOCUMENTS

| | | |
|---|---|---|
| 4,970,912 A | 11/1990 | Wolf .......................... 74/501.6 |
| 5,018,469 A | 5/1991 | Carlson .................. 114/144 R |
| 5,050,697 A | 9/1991 | Umemura ................... 180/141 |
| 5,105,924 A | 4/1992 | Carlson ..................... 192/8 R |
| 5,111,761 A * | 5/1992 | Gilbertson .............. 114/144 R |
| 5,127,856 A * | 7/1992 | Kabuto et al. ........... 114/144 R |
| 5,174,407 A | 12/1992 | Shimizu et al. ............ 180/79.1 |
| 5,386,879 A | 2/1995 | Shimizu ...................... 180/79 |
| 5,387,142 A * | 2/1995 | Takayanagi et al. .... 114/144 R |
| 5,482,130 A | 1/1996 | Shimizu ..................... 180/79.3 |
| 5,489,004 A | 2/1996 | Shimizu et al. ............... 180/79 |
| 5,503,239 A | 4/1996 | Shimizu ...................... 180/79 |
| 5,542,505 A * | 8/1996 | Kempf ..................... 192/223.4 |
| 5,887,675 A | 3/1999 | Hackl et al. ................. 180/422 |
| 6,155,377 A | 12/2000 | Tokunaga et al. ........... 180/446 |
| 6,164,150 A | 12/2000 | Shindo et al. .......... 74/388 PS |

\* cited by examiner

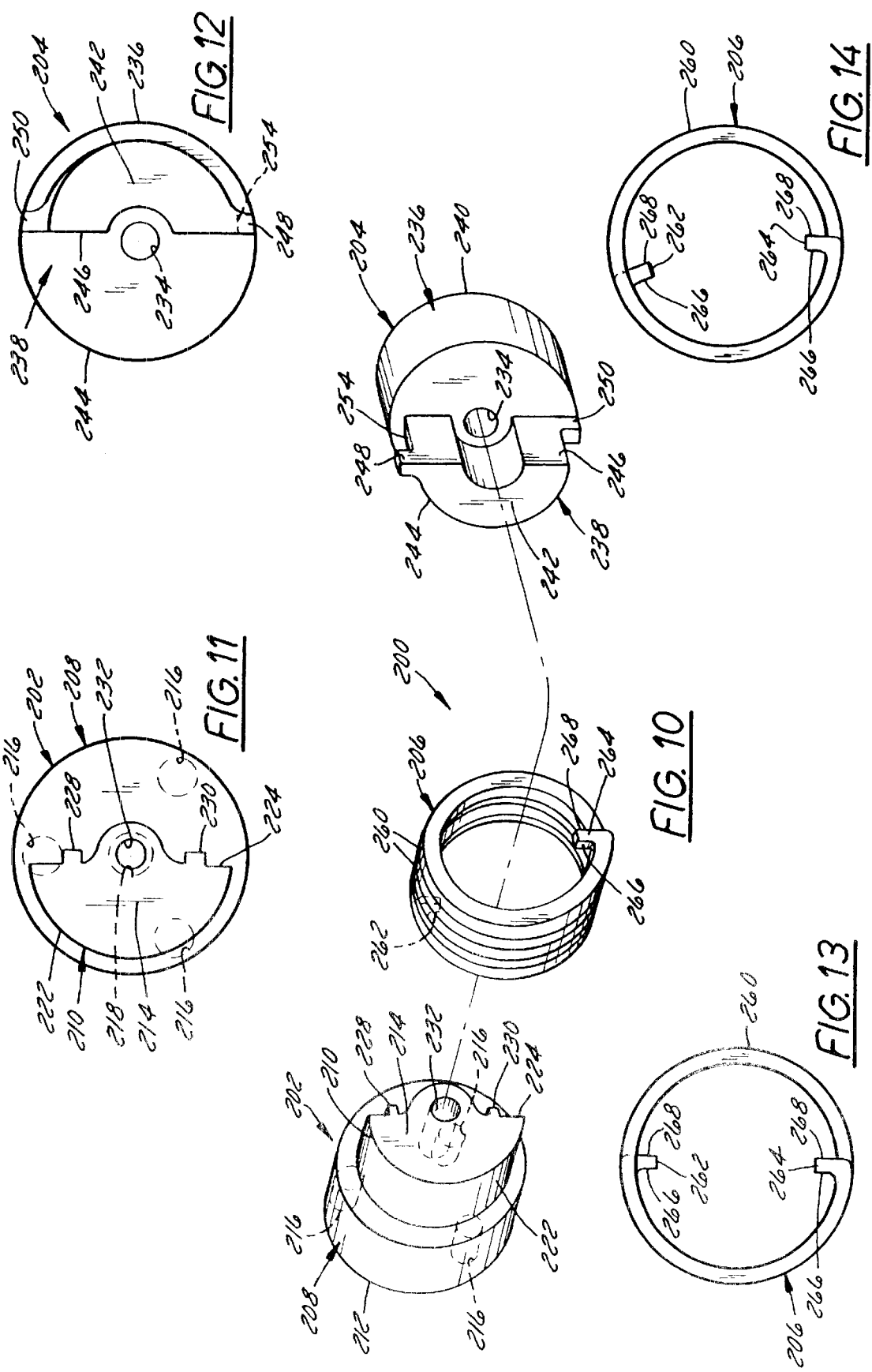

STEERING SYSTEM

BACKGROUND OF THE INVENTION

1. Field of the Invention

The invention relates to steering systems suitable for use in off-highway applications and, more particularly, relates to a steering system usable, e.g., in a watercraft such as a boat or a jet ski or in an off-highway wheeled vehicle such as a tractor or other agricultural implement. Specifically, the invention relates to a steering system that incorporates (1) a manually selectable multi-ratio speed changer that permits the responsiveness or required steering effort of the system to be varied upon demand and/or (2) incorporates a torque gate acting as an anti-backdrive mechanism that prevents forces imposed on or by the steered mechanism from being transmitted back through the steering system to the steering mechanism.

2. Discussion of the Related Art

A wide variety of steering systems are available for transmitting steering forces from a steering mechanism such as a steering wheel to a steered mechanism such as a steered wheel or a rudder. The optimal steering response characteristics for such steering systems vary depending on prevailing operating conditions. Forces imposed on or by the rudder or other steered mechanism may also be transmitted back through the steering system to the steering wheel or other steering mechanism. These forces can result in wear and tear on steering system components and risk operator discomfort or even loss of vehicle control. Applications include both off-highway wheeled vehicles and watercraft.

Wheeled vehicles exhibiting the above noted characteristics include, but are not limited to, agricultural machines such as tractors. Vehicles of this type typically incorporate a steering wheel as the steering mechanism and one or more steered wheels as the steered mechanism. Steering forces are transferred to the steered wheel by a torque transfer system that includes a gear reducer that reduces the rotational velocity of a rotary drive input element for the steered wheel (such as a drive pinion for a rack and pinion steering system) relative to the rotational velocity of the steering wheel. Responsiveness and steering forces in these systems are necessarily inversely related. A system having a relatively high numerical speed reduction ratio can be operated with relatively low steering forces but requires a relatively large range of angular movement of the steering wheel to effect a given vehicle turning angle. Conversely, a system with a lower speed reduction ratio requires more operator effort to effect a given turning angle but requires a smaller range of steering wheel angular motion to effect a given turning angle. The reduction ratios of these systems are usually fixed. Steering response characteristics and steering effort are invariable as a result. This lack of versatility hinders optimal steering over the full range of operating conditions typically experienced by many vehicles.

For instance, in the case of a tractor, a relatively high speed reduction ratio (e.g., in the order of 6:1) might be desirable for in-field operating conditions in which the tractor is operated over rough terrain and under conditions in which the steering wheel is relatively difficult to turn but in which sharp turns are unnecessary. On the other hand, a relatively low speed reduction ratio (e.g. on the order of 3:1) might be desirable when the tractor is operating in smoother fields or when sharp turns are required at the ends of rows. The reduction ratios of most known steering systems are set either to provide a compromise between these (and possibly other) desired response characteristics or are simply set to provide the response characteristic most often exhibited by the vehicle. Neither arrangement is optimal.

In watercrafts such as boats, jet skis, etc., a steered mechanism such as a pivoting outboard motor, jet nozzle, or a separate rudder is steered by operating a steering mechanism, typically a steering wheel or handlebars. In the case of boats having steered outboard motors, the steering forces are typically transmitted to a pivoting mount for the motor by either a mechanical or hydraulic system. Mechanical systems typically have relatively low speed reduction ratios, resulting in good responsiveness but requiring relatively high steering effort. Hydraulic systems typically have relatively high speed reduction ratios, resulting in relatively low responsiveness but requiring relatively little steering effort. They are also more expensive than mechanical systems, are prone to leaks, and are heavy. Nearly all such systems, like the corresponding steering systems for land-based vehicles, have a set, invariable speed reduction ratio. This limitation is just as problematic, if not more problematic, for marine applications as for land-based applications. Specifically, a relatively high speed reduction ratio would be desirable when operating a boat at high speeds in open water because sharp turns are seldom required under these conditions, but reaction forces on the rudder impose substantial resistance to turning. Conversely, when narrow turns are required at low speed operation but against lower resistance to turning, as would normally occur when maneuvering around a dock area, the operator would prefer to have more responsiveness, making a relatively low gear reduction ratio desirable. The problems encountered at lower speeds are compounded by the fact that the rudder is typically less effective at changing the heading of a boat at slower speeds, hence requiring a greater angular change on the rudder to achieve the same steering effect. Known mechanical steering systems, typically having relatively low speed reduction ratios (on the order of 3:1), exhibit adequate response characteristics at lower speeds but are relatively hard to steer at high speeds in the open water. Hydraulic systems, typically having a gear reduction ratio on the order of 6½:1, are relatively easy to steer at all speeds but provide less responsiveness than some operators desire at low speeds during sharp turns.

Some proposals have been made to vary the responsiveness of a steering system to render the system more versatile. For instance, U.S. Pat. No. 5,018,469 to Carlson proposes a variable ratio steering helm for a boat. Steering forces are transmitted to a rudder via a rack and pinion system coupled to a steering wheel. The pinion of the system is mounted eccentrically relative to the gear that drives it. This eccentricity is set to provide progressively increased leverage as the steering wheel progressively turns, thereby permitting the system to counteract increasing rudder forces encountered in sharp turns. The system disclosed in the Carlson patent is less than perfect because the speed reduction ratio provided by the system varies automatically, leaving the operator without a sense of control. The speed reduction ratio also cannot be varied for any particular steering wheel position. The operator therefore cannot tailor the response characteristics to meet the needs of the prevailing operating conditions.

U.S. Pat. No. 3,225,620 to Dubin discloses a multiple ratio steering system for a boat that permits an operator to select one of two distinct speed reduction ratios. The system including a steering shaft coupled to a steering wheel, an output shaft coupled to the rudder, and a system of gears disposed between the steering shaft and a pinion coupled to the boat's rudder. These gears include first and second spur gears coupled to the steering shaft and third and fourth spur gears mounted on an output shaft that also bears the pinion. The first and second spur gears are slidable along the steering shaft by way of a key connected to an operator-manipulated adjustment rod. Depending upon the shifting position selected by the operator, either the first and third gears or the second and third gears mesh. One speed reduction ratio is obtained when the first and third gears mesh and a second, different speed reduction ratio is obtained when the second and fourth gears mesh. While this system provides operator control over the reduction ratio of a steering system, it is difficult to implement because the gears that transfer torque through the steering system must translate axially relative to the system. System robustness suffers as a result. The system must also be relatively large to accommodate the sliding movement of the two axially-spaced spur gears, prohibiting its use in many applications.

Both land-based and marine steering systems are also potentially subject to undesirable backdrive to the steering mechanism from the steered mechanism. In the case of marine applications, reaction forces on the rudder, steering torques, and other forces imposed on or by the rudder can be transmitted back through the steering system to the steering wheel. The operator must vigilantly maintain control of the steering wheel in order to prevent these transmitted forces from diverting the boat from its intended path. The vibrations and shocks transmitted by these backdrive forces also subject the entire steering system to substantial wear and tear. Land-based vehicles, particularly tractors or other vehicles that must travel over rough or uneven terrain, exhibit similar problems.

Proposals have been made to reduce or eliminate backdrive forces to a steering mechanism from a steered mechanism through the incorporation of an anti-feedback mechanism into the steering system. Examples of such systems are disclosed in U.S. Pat. No. 2,819,777 to Kosch and U.S Pat. No. 2,947,278 to Magill. Both systems employ a spring that is located between rotary input and output elements of the steering system. The spring is operable to 1) grip a stationary surface upon rotation of the output element relative to the input element to prevent backdrive and 2) release from the stationary surface upon rotation of the input element relative to the output element so as to permit steering forces to be transmitted to the steered mechanism. These structures, however, are relatively complex and are not sufficiently robust for use in many applications. They also are not designed for use with a multi-ratio speed changer or to be placed in the same package as such a speed changer.

The need has therefore arisen to provide a steering system that is usable, e.g., in marine applications or off-highway land vehicle applications and that incorporates measures to permit the operator to select between multiple, distinct speed change ratios.

The need further exists for a steering system having a multi-ratio speed changer that is robust, compact, and relatively simple.

The need further exists to provide a steering system having a simple, compact, and robust anti-backdrive mechanism usable either in conjunction with or independently of a multi-ratio speed changer.

SUMMARY OF THE INVENTION

In accordance with a first aspect of the invention, a steering system comprises a manually operated steering mechanism, a steered mechanism, and a steering transmission coupling the steering mechanism to the steered mechanism. The steering transmission includes a multi-ratio speed changer and a torque gate. The speed changer has an input element that is coupled to the steering mechanism, an output element that transmits steering forces to the steered mechanism, and a shifter that is movable between at least first and second shifted positions to vary a speed change ratio of the speed changer between at least first and second distinct change ratio. The torque gate couples the output element of the speed changer to the steered mechanism so as to permit steering forces to be transmitted to the steered mechanism from the speed changer in either direction while preventing backdrive forces from being transmitted to the speed changer and ultimately to the steering wheel from the steered mechanism.

Preferably the speed changer comprises at least one planetary gear set including a planet gear, a ring gear, and a plurality of planet gears positioned between the ring gear and the sun gear. At least one of the gears is selectively fixable from rotation upon movement of the shifter into one of the shifted positions thereof in order to alter the change ratio of the speed changer. Even more preferably, the speed changer includes at least two planetary gear sets, each of which provides a different speed change ratio when selected. Movement of the shifter into a selected one of the shifted positions thereof selects one of the planetary gear sets for the transfer of torque from the steering mechanism to the steered mechanism. In a particularly preferred embodiment, the first planetary gear set has a first sun gear, a first ring gear, and a first plurality of planet gears disposed between the first ring gear and the first sun gear. The second planetary gear set has a second sun gear, a second ring gear, and a second plurality of planet gears disposed between the second ring gear and the second sun gear. The first and second sun gears typically are of first and second different diameters. Movement of the shifter into one of the shifted positions thereof arrests at least one gear of a corresponding one of the first and second planetary gear sets from rotation.

The torque gate preferably comprises a stationary surface, a release driver, a locking driver, and a wrapped spring. The release driver is coupled to the output element of the speed changer and is rotatable relative to the stationary surface. The locking driver is coupled to the steered mechanism and is rotatable relative to the stationary surface. The release driver and the locking driver have axially-extending drive surfaces that face one another with a circumferential gap therebetween. The wrapped spring that has at least one coil that is disposed adjacent the stationary surface. The release, driver, the locking driver, and the stationary surface are dimensioned and configured relative to one another such that, (1) upon rotation of the release driver in either direction under torsional forces imposed on the torque gate by the speed changer, the spring rotates relative to the stationary surface so as permit the drive surface of the release driver to engage the drive surface on the locking driver and to drive the locking driver to rotate, thereby permitting torque transfer to the steered mechanism from the output element of the speed changer, and (2), in the absence of the imposition of an overpowering steering force on the release driver from the speed changer, and upon rotation of the locking driver in either direction under torsional forces imposed on the torque gate by the steered mechanism, the spring locks against the stationary surface so as prevent the drive surface of the locking driver from driving the release driver to rotate, thereby preventing torque transfer to the speed changer and the steering mechanism from the steered mechanism.

If the stationary surface is the inner peripheral surface of a clutch housing, a diameter of the housing may be adjustable to maintain a desired positional relationship between the coil of the spring and said inner peripheral surface of the housing.

The steering system is usable in virtually any off-highway application, including marine applications such as boats and land-based applications such as agricultural vehicles. In addition, some applications may have one or the other of the speed changer and torque gate but not both.

An improved method of transmitting torque to a steered mechanism such as a rudder or a steered wheel from a steering mechanism such as a steering wheel is also disclosed.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 10 is an exploded perspective view of the internal components of a torque gate of the steering transmission of FIGS. 3–8;

FIG. 11 is an end elevation view of a release driver of the torque gate of FIG. 10;

FIG. 12 is an end elevation view of a locking driver of the torque gate of FIG. 10;

FIG. 13 is an end elevation view of a wrapped spring of the torque gate of FIG. 10, illustrating the spring in a precompressed state thereof;

FIG. 14 corresponds to FIG. 13 and illustrates the spring in a relaxed state thereof;

DETAILED DESCRIPTION OF THE PREFERRED EMBODIMENTS

1. Resume

Pursuant to the invention, a steering transmission is usable in a wide variety of applications in which steering forces must be transmitted from a steering mechanism, such as a steering wheel or handlebars, to a steered mechanism, such as the rudder of a boat or the steered wheel(s) of an off-road vehicle. The steering transmission includes one and preferably both of a multi-ratio speed changer and a torque gate. The multi-ratio speed changer preferably takes the form of one or more planetary gear sets coupling an input shaft of the transmission to a rotary output of the transmission (either directly or indirectly via the torque gate). The speed changer is shifted by manually operating a shifter to switch between two or more distinct speed change ratios, thereby permitting the operator to select the combination of responsiveness and steering effort desired for the prevailing operating conditions. The torque gate preferably takes the form of a release driver, a locking driver, and a wrapped spring disposed between the release driver and the locking driver. The spring moves relative to a housing or other stationary surface upon the transmission of steering forces to the clutch from the steering mechanism (either directly or indirectly through the multi-ratio speed changer) to permit steering torque to be transmitted to the release driver but grips the stationary surface upon the imposition of external backdrive forces on the steering system so as to prevent the transmission of those forces back to the steering wheel and other upstream components of the steering system.

2. System Overview

The steering transmission as described and claimed herein is usable in a wide variety of applications in which forces are transferred to a steered mechanism from a steering mechanism. It is particularly well-suited for applications in which operator selection of responsiveness and/or steering effort is desired and/or in which there is a desirability of eliminating or reducing the transmission of forces imposed to the steering mechanism from the steered mechanism. For instance, the invention is applicable to land-based vehicles, such as tractors or other agricultural vehicles, in which case the steered mechanism will include one or more steered wheels of the vehicle and the steering mechanism will typically include a steering wheel. It is also applicable to a variety of marine applications, such as boats and jet skis, in which case the steered mechanism will include a rudder or jet nozzles, and the steering mechanism will include a steering wheel or handlebars. The invention will now be described in conjunction with a relatively small boat steered by a pivoting outboard motor, it being understood that it is equally applicable to the above-described additional and many other applications as well.

Figure 1:
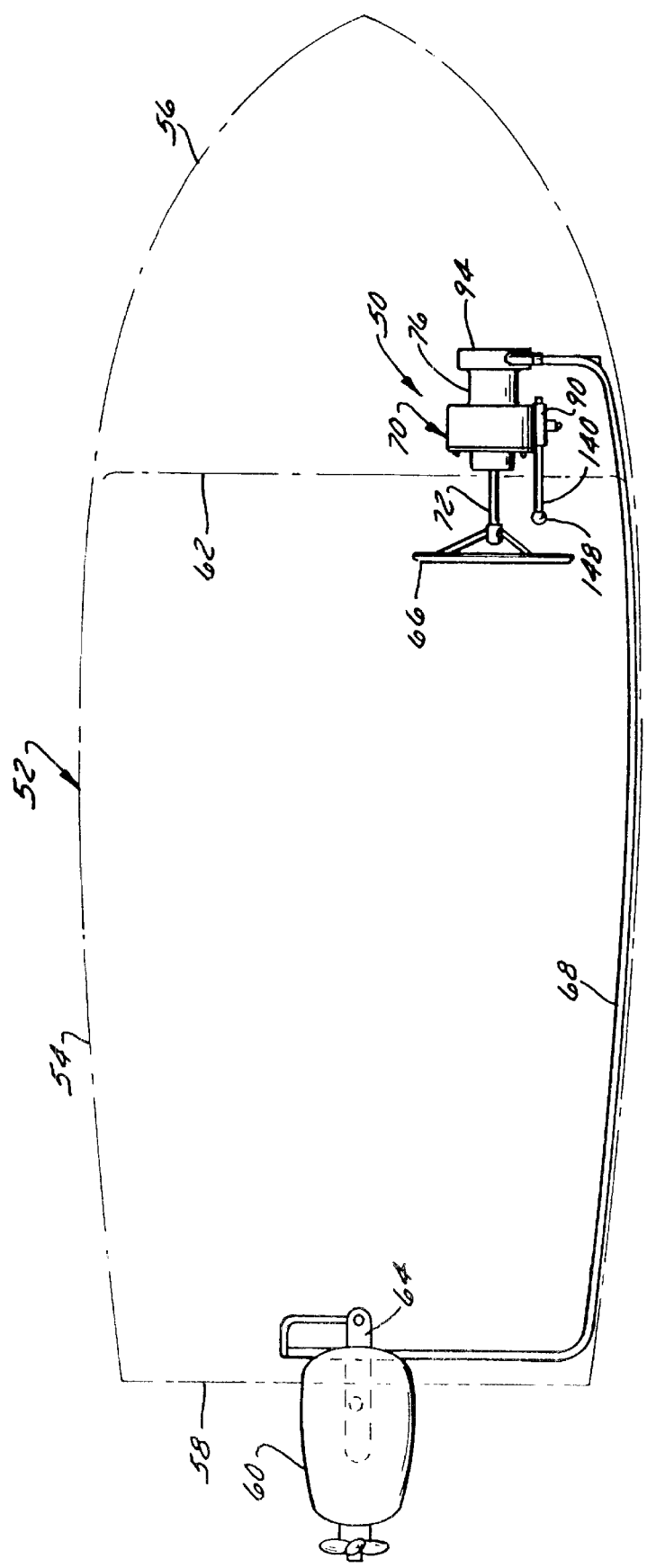
FIG. 1 is a schematic top plan view of a boat incorporating a steering system constructed in accordance with a preferred embodiment of the present invention.
Figure 2:
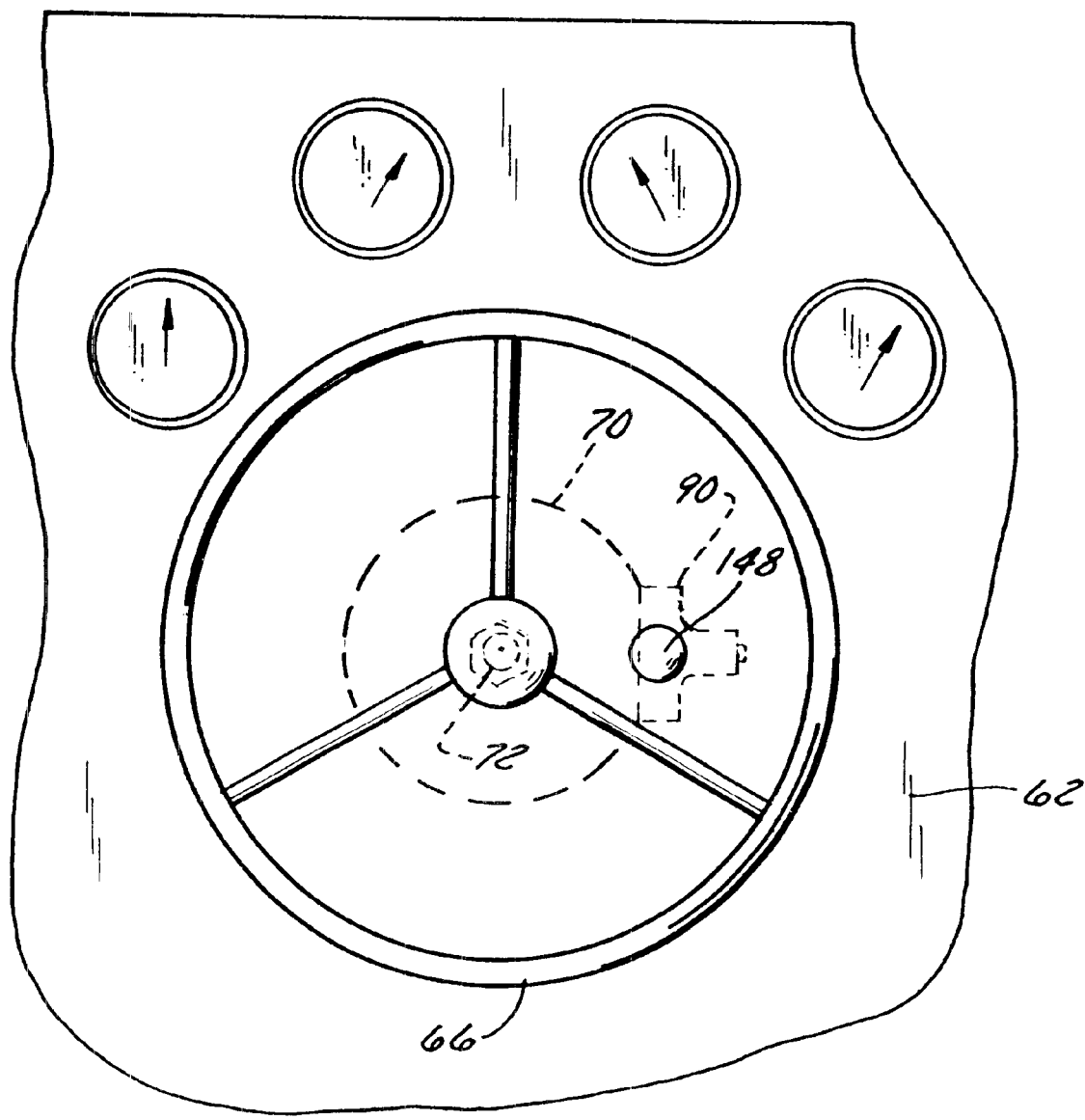
FIG. 2 is an elevation view of a portion of a cowling of the boat of FIG. 1 and a steering wheel mounted on the cowling.

Turning now to the drawings and initially to FIG. 1, a boat 52 incorporates a steering system 50 constructed in accordance with a preferred embodiment of the present invention. The boat 52 includes a hull 54 having fore and aft ends 56 and 58, an outboard motor 60 mounted on the aft end 58 of the hull 54, and a dash or cowling 62 extending laterally across the hull near the fore end 56. As is conventional, the motor 60 is mounted on the boat 52 by a pivoting mount assembly 64 that permits the motor 60 to be pivoted about a vertical axis to cause a rudder formed on or by the motor 60 to steer the boat 52. The motor 60 could alternatively be a non-pivoting inboard or outboard motor, and boat 52 could be steered by one or more rudders movable separately from the motor 60.

Referring now to FIGS. 1–4, the steering system 50 for the boat 50 includes the motor 60, a steering wheel 66 serving as the boat's steering mechanism, and a steering force transfer system including a cable 68 and a steering transmission 70. The cable 68 leads from the pivoting mount 64 to a pulley 74 (FIGS. 5 and 7) serving as the output of the steering transmission 70. The steering wheel 66 is mounted on a steering shaft 72 extending through the cowling 62. The cable 68 is a push/pull cable that converts rotational movement of the pulley 74 into pivoting movement of the mount 64 in a manner that is, per se, well known.

The steering transmission 70 comprises a multi-ratio speed changer 100 and a torque gate 200 mounted in a common, compact housing 76. The speed changer 100 is supported on the steering shaft 72 which, in turn, is mounted on the housing 76 at its inner end by a ball bearing 78 and is supported in the torque gate 200 at its outer end as detailed below. The torque gate 200 is journaled directly in the housing 76. Alternatively, the shaft 72 could extend through the torque gate 200 and be journaled in the housing 76 at its outer end via a bearing, in which case the locking and release drivers of the torque gate 200 could ride on the shaft 72. Because of the construction of and interrelationship between the speed changer 100 and the torque gate 200, the transmission 70 is sufficiently small (on the order of 8" long by 7" in diameter) to be mounted behind the cowling 62 without interference from any other components of the boat 52.

Figure 3:
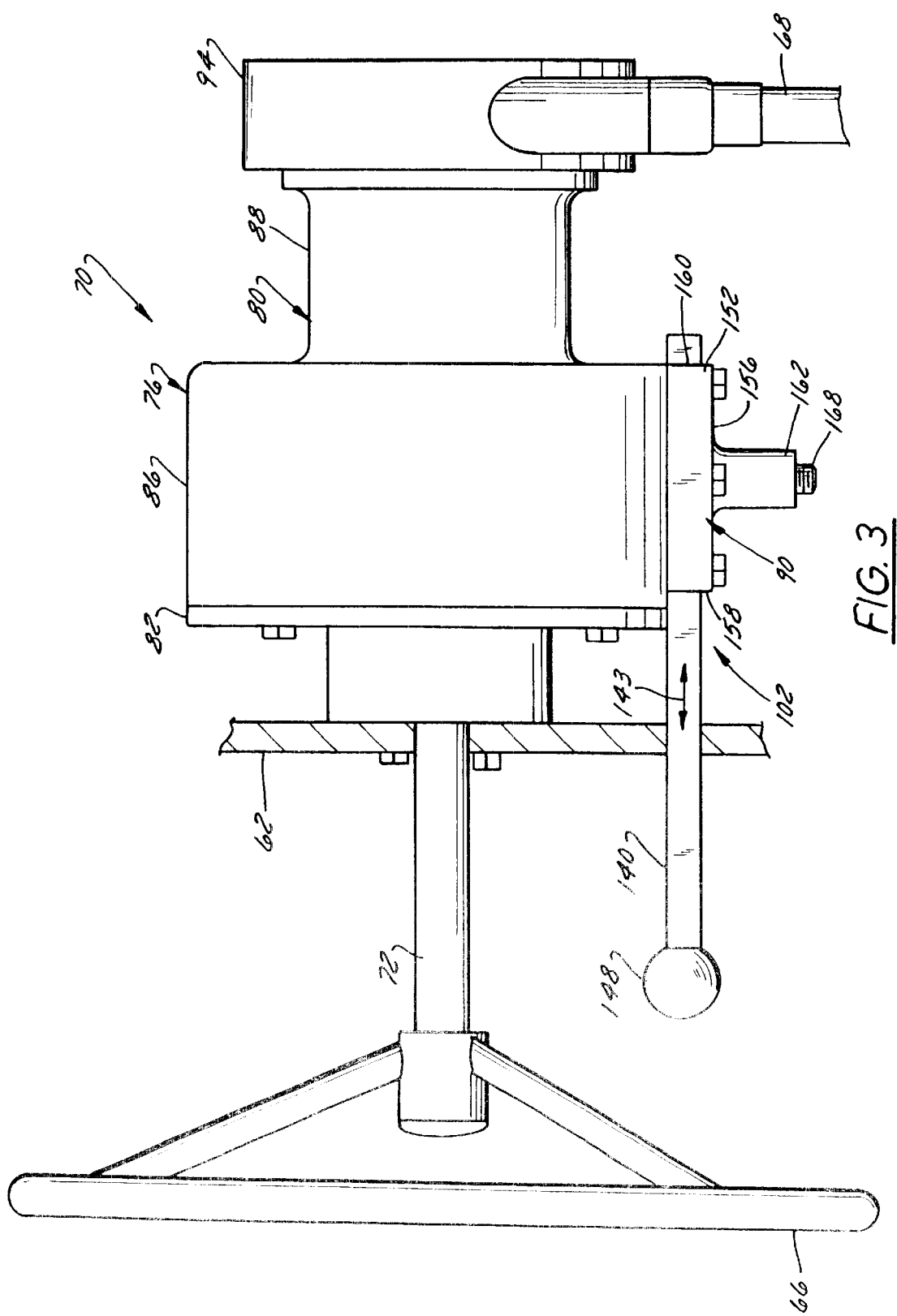
FIG. 3 is a partially sectional, top elevation view of the cowling of FIG. 1 and of a steering transmission of the steering system and the associated steering wheel and driven cable.
Figure 4:
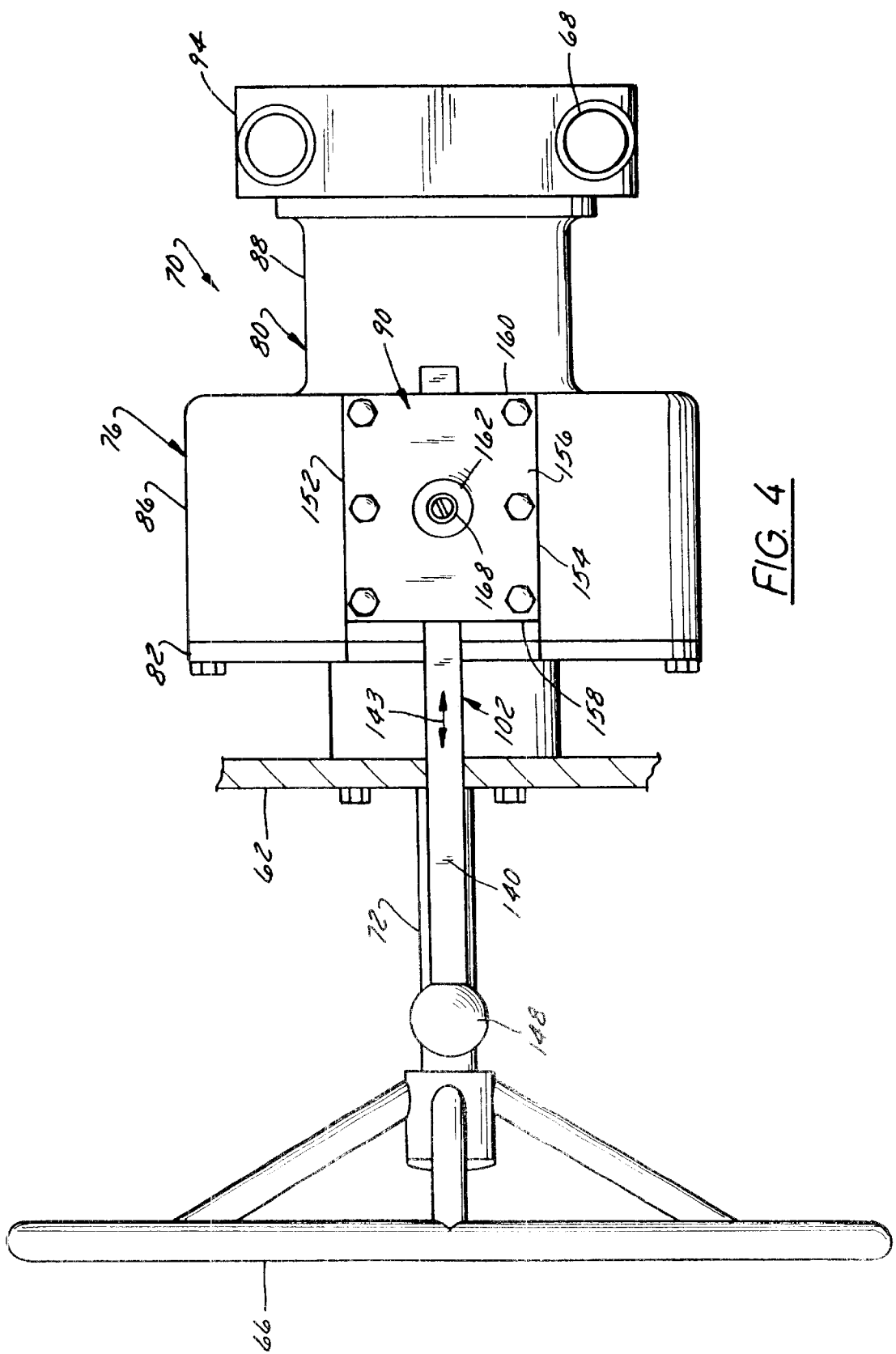
FIG. 4 is partially sectional, side elevation view of the structures depicted in FIG. 3.
Figure 5:
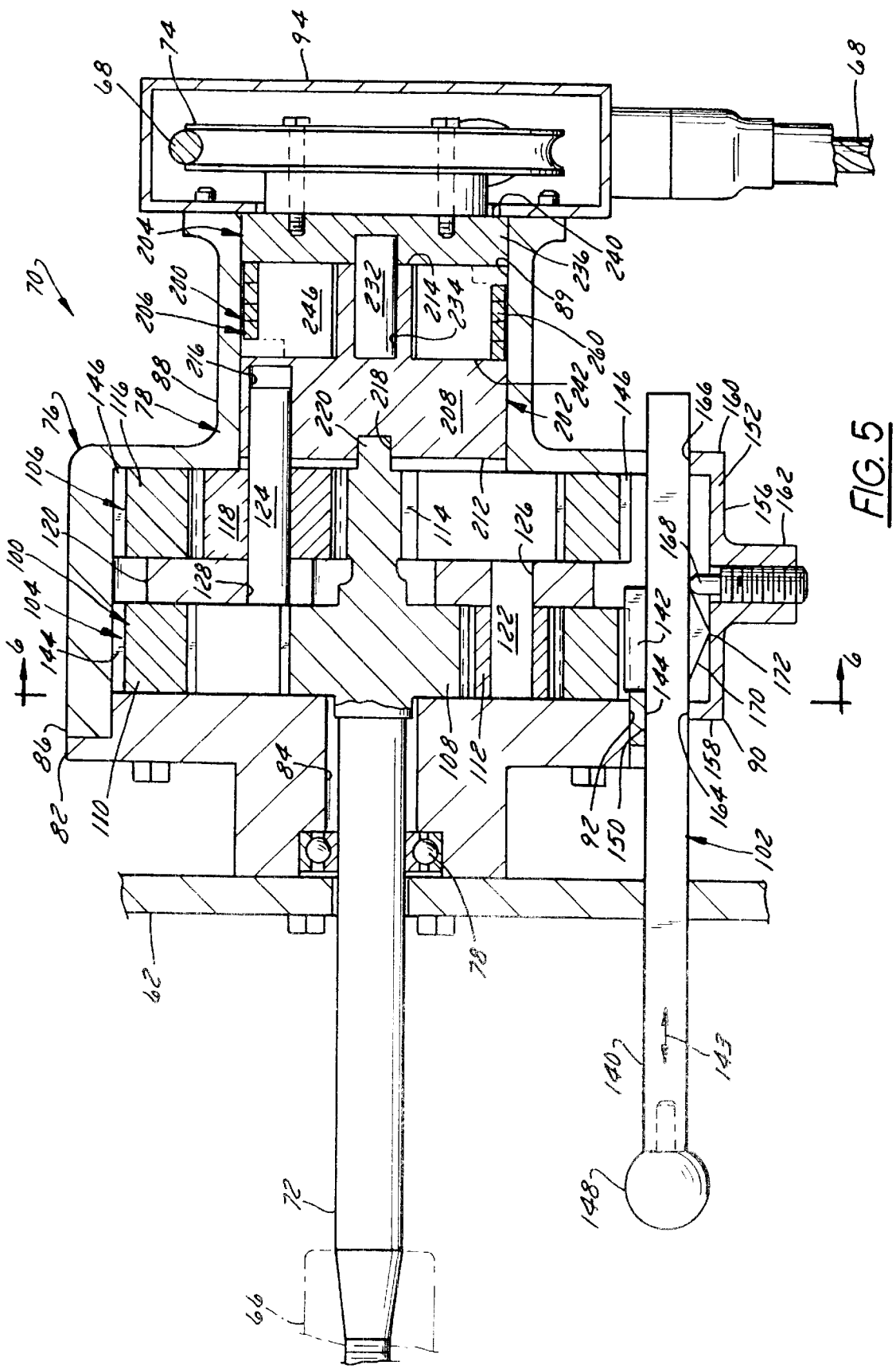
FIG. 5 is a side sectional elevation view of the steering transmission, illustrating a multi-ratio speed changer of the transmission in a first operational position thereof.

Referring to FIGS. 3–5, the housing 76 includes a stepped cylindrical body 80, and an end cap 82 bolted to the front end of the body 80. The end cap 82 has a central bore 84 formed therethrough for receiving the steering shaft 72. The end cap 82 also is bolted to the cowling 62 (FIG. 1) to mount the transmission 70 on the boat 52 (FIG. 1). Additional brackets (not shown) may, if desired, be provided to additionally support the housing 76 on the cowling 62 and/or the hull 54. The body 80 stepped so as to present a front portion 86 of relatively large diameter and rear portion 88 of relatively small diameter. The speed changer 100 is housed in the front portion 86. The torque gate 200 is housed in the rear portion 88 in coaxial alignment with the speed changer 100. A guide 90 for a shifter of the speed changer 100 is bolted on a truncated side surface 92 of the front portion 86. Finally, a pulley guard 94 is bolted over the rear end of the housing 76 to enclose the pulley 74 and the adjacent looped portion of the cable 68.

As discussed briefly above, the multi-ratio speed changer 100 and torque gate 200 are configured to transfer steering torque to the pulley 74 at a speed change ratio that is selected by the operator and without the imposition of backdrive forces on the steering wheel 66. The speed changer 100 and torque gate 200 will now be described in turn.

3. Construction and Operation of the Multi-Ratio Speed Changer

The multi-ratio speed changer 100 is configured so as to be manually shiftable between at least first and second positions to obtain at least two distinct, constant speed change ratios. The speed changer 100 of the present embodiment includes a gear reducer, preferably formed from at least one planetary gear set and a shifter 102 that can be operated to selectively arrest at least one gear of the gear set from rotation, thereby altering the speed change ratio of the speed changer. It is conceivable that a single gear set could be employed and coupled to the torque gate 200 (or other downstream rotational device of the system 50 if the clutch 200 is not employed in a particular system) so that manipulation of one or more components of the single planetary gear set changes the speed change ratio of the speed changer 100. However, in the illustrated embodiment, the speed changer 100 includes multiple planetary gear sets, one of which is provided for each desired speed change ratio. Referring to FIGS. 5–9, two gear sets 104 and 106 are provided in the present exemplary embodiment and are configured to provide two distinct, different speed reduction ratios. Additional planetary gear sets could be provided in order to provide the operator with more speed change options, including other speed reduction ratios or even speed increase ratios. Both planetary gear sets 104 and 106 are mounted on the steering shaft 72, which also serves as the input element for the speed changer 100.

Figure 6:
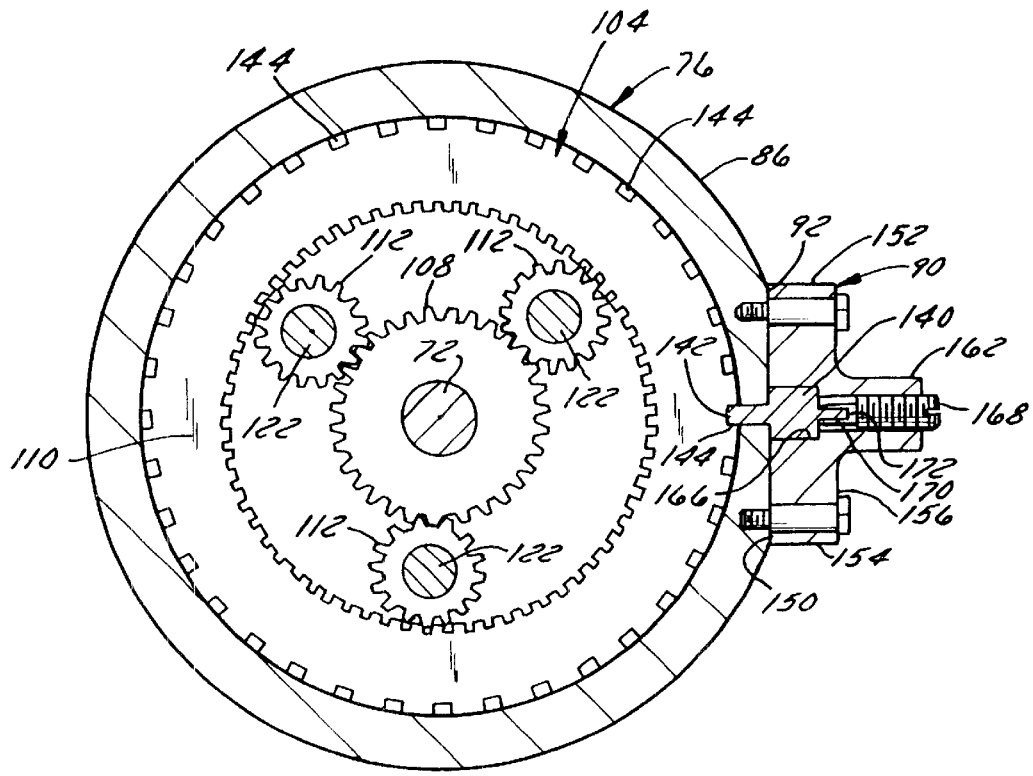
FIG. 6 is a sectional end view taken generally along the lines 6—6 in FIG. 5.
Figure 9:
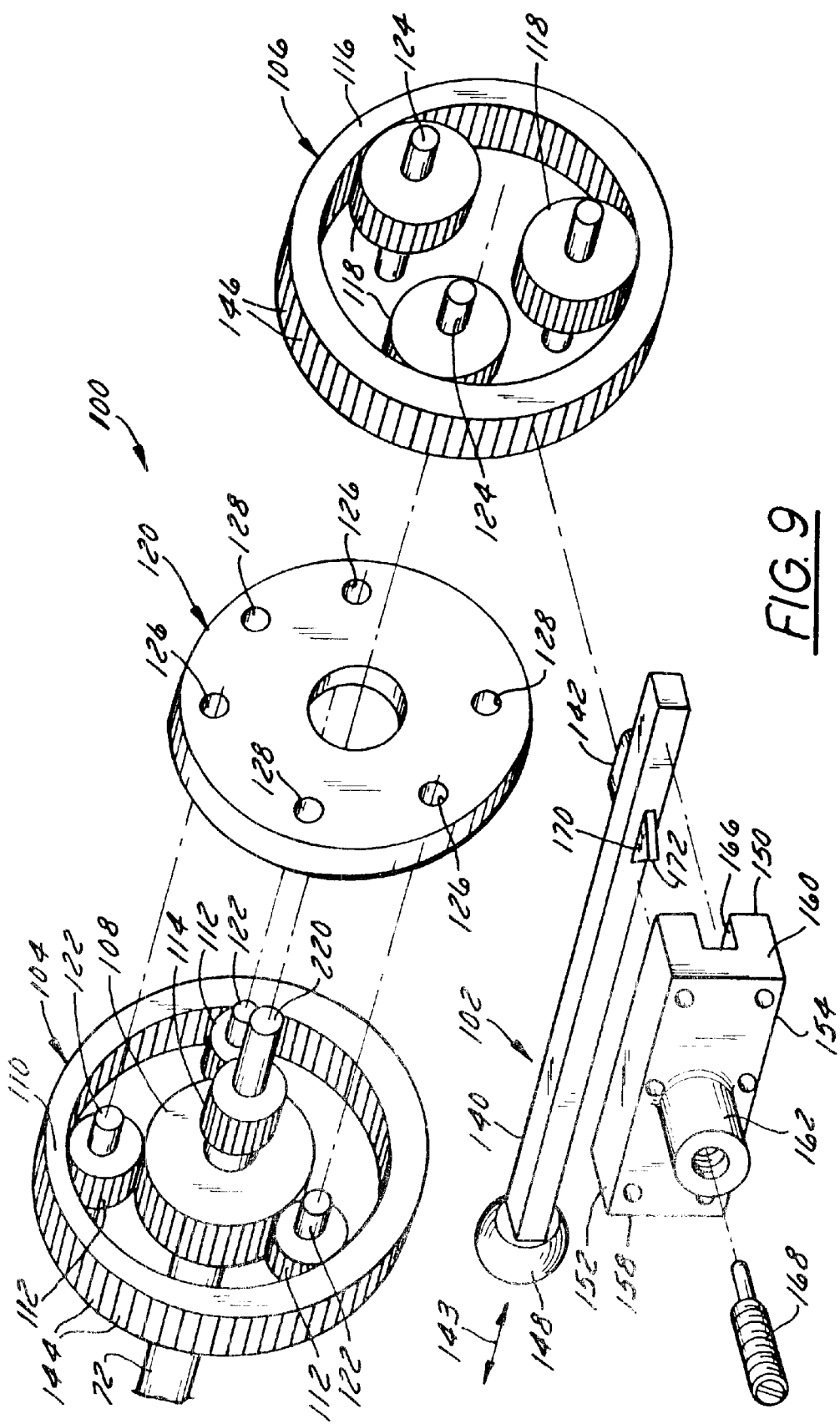
FIG. 9 is an exploded view of the internal components of the speed changer.

Still referring to FIGS. 5, 6, and 9, first planetary gear set 104 includes a first sun gear 108 mounted on or formed integrally with the steering shaft 72, a first ring gear 110 that coaxially surrounds the first sun gear 108, and a first plurality of planet gear 112 disposed between and in a meshing engagement with the first sun gear 108 and the first ring gear 110. The second planetary gear set 106 similarly includes a second sun gear 114 mounted on or formed integrally with the steering shaft 72, a second ring gear 116 that coaxially surrounds the second sun gear 114, and a second plurality of planet gears 118 disposed between and in meshing engagement with the second sun gear 114 and the second ring gear 116. In the illustrated embodiment, the first sun gear 108 is keyed or otherwise fixed onto the shaft 72, and the second sun gear 114 is formed integrally with the rear end portion of the shaft 72. Each set of planets contains three planet gears. However, the number of planet gears 112 and 118 could vary from application to application. For instance, a greater number of planet gears might be desired in applications in which one wishes to reduce the overall diameter of the system in order to conserve space. All planet gears are supported on a common carrier 120 that is disposed axially between the two planetary gear sets 104 and 106. More specifically, the carrier 120 takes the form of a disc having a diameter that approximately equals the diameter of the ring gears 110 and 116. Each planet gear 112, 118 is mounted on or formed with a pin 122, 124 that extends through a corresponding bore 126, 128 in the carrier 120 (the pins 122 or 124 or similar structures could alternatively be formed on or in the carrier 120). At least one pin, and preferably all three pins 124 associated with the second planetary gear set 106, extend into corresponding bores in the inner axial end 208 of the release driver 202 of the torque gate 200 (detailed below) to couple the speed changer 100 to the torque gate 200. Arcuate spacers (not shown) may be mounted on the carrier 120 or elsewhere in the speed changer 100 to help maintain the concentricity of the ring gears 110 and 116 relative to the remainder of the speed changer 100. In addition, annular anti-friction spacers (not shown) could be located between the ring gears 114 and 116 and between other relatively rotating adjacent components of the system to prevent metal-to-metal contact between those components.

As a result of this arrangement, steering forces generated by the steering wheel 66 generate a drive torque in the shaft 72 that is transmitted through the planet gears 112 or 118 to a selected one of the first and second planetary gear sets 104 or 106, to the carrier 120, and to the torque gate 200. The speed change ratio obtained by the speed changer 100 in a selected operating position is determined by the diameter of the sun gear 108 or 114 of the selected planetary gear set. In order to provide the desired speed change ratio selection capability, the two sun gears 108 and 114 are of different diameters, with the sun gear 108 of the first planetary gear set 104 being of a relatively large diameter to provide a relatively low numerical speed reduction ratio, and the sun gear 114 of the second planetary gear set 106 being of relatively small diameter to provide a relatively large numerical speed reduction ratio. (Alternatively, the sun gears 108 and 114 could be of equal diameters, and the corresponding ring gears 110 and 116 could be of different diameters). In the illustrated embodiment, the first and second sun gears 108 and 114 are configured relative to one another and to the remainder of the system 50 such that transmission of drive torque through the first sun gear 108 results in an approximately 3:1 speed reduction ratio, and transmission of drive torque through the second sun gear 114 results in approximately 6½:1 speed reduction ratio. These ratios were selected because the low (3:1) speed reduction ratio is typical for that employed by a mechanical system and the high (6½:1) speed reduction ratio is typical for that employed by a hydraulic system. The speed changer 100 therefore permits selection of response characteristics typical for either a mechanical system or a hydraulic system at a cost that is substantially less than a hydraulic system. However, these ratios may vary depending upon the design parameters of a particular system. Speed increase ratios are even possible.

The shifter 102 is manually operable to select one of the two planetary gear sets 104 or 106 for torque transfer by arresting a gear of that planetary gear set from rotation. In the illustrated embodiment, the operative gear is the ring gear 110 or 116. The ring gear 116 or 110 of the non-selected planetary gear set 106 or 104 is allowed to rotate freely, thereby neutralizing that planetary gear set for torque transfer. Referring to FIGS. 5–9, the illustrated shifter 102 comprises an axially movable shifter rod 140 mounted on the guide 90. The front end of the shifter rod 140 extends beyond the inner end of the housing 76, through the cowling 62, and terminates in a knob 148 that is accessible by the operator while handling the steering wheel 66. A tang 142 extends radially from the shifter rod 140 towards the planetary gear sets 104 and 106. The tang 142 is configured such that, as the shifter rod 140 is translated to drive the tang 142 axially in the direction of arrow 143 in FIGS. 3–5, 7, and 9, the tang 142 slides into engagement with one of a plurality of peripherally spaced, axially extending notches 144 or 146 formed in the outer radial peripheral surface of the selected ring gear 110 or 116 to arrest that ring gear from rotation. The tang 142 also has rounded ends and/or is otherwise configured to facilitate engagement with the tang 142 with a notch 144 or 146 if the tang 142 and the notch are slightly misaligned. Enough notches 144, 146 are formed in the surface of each ring gear 110, 116 to require only a small amount of steering wheel rotation to align the notches on the selected ring gear with the tang 142 and permit sliding motion of the tang 142 into the aligned notch 144 or 146.

Still referring to FIGS. 5–9, the shifter rod 140 is supported and guided for sliding movement relative to the housing 76 by the guide 90, which is bolted over the opening on the truncated side 92 of the housing portion 86. As best seen in FIGS. 5 and 6, the guide 90 is a metal box-like structure having an open inner surface 150, opposed enclosed side walls 152 and 154, an enclosed outer wall 156, and end walls 158 and 160. A tubular boss 162 extends outwardly from the outer wall 156. The opposed side walls 152 and 154 are bolted onto truncated section 92 of the housing portion 86. Openings 164 and 166 are formed in the end walls 158 and 160 for supporting and guiding the shifter rod 140 as it slides fore and aft relative to the guide 90.

Figure 7:
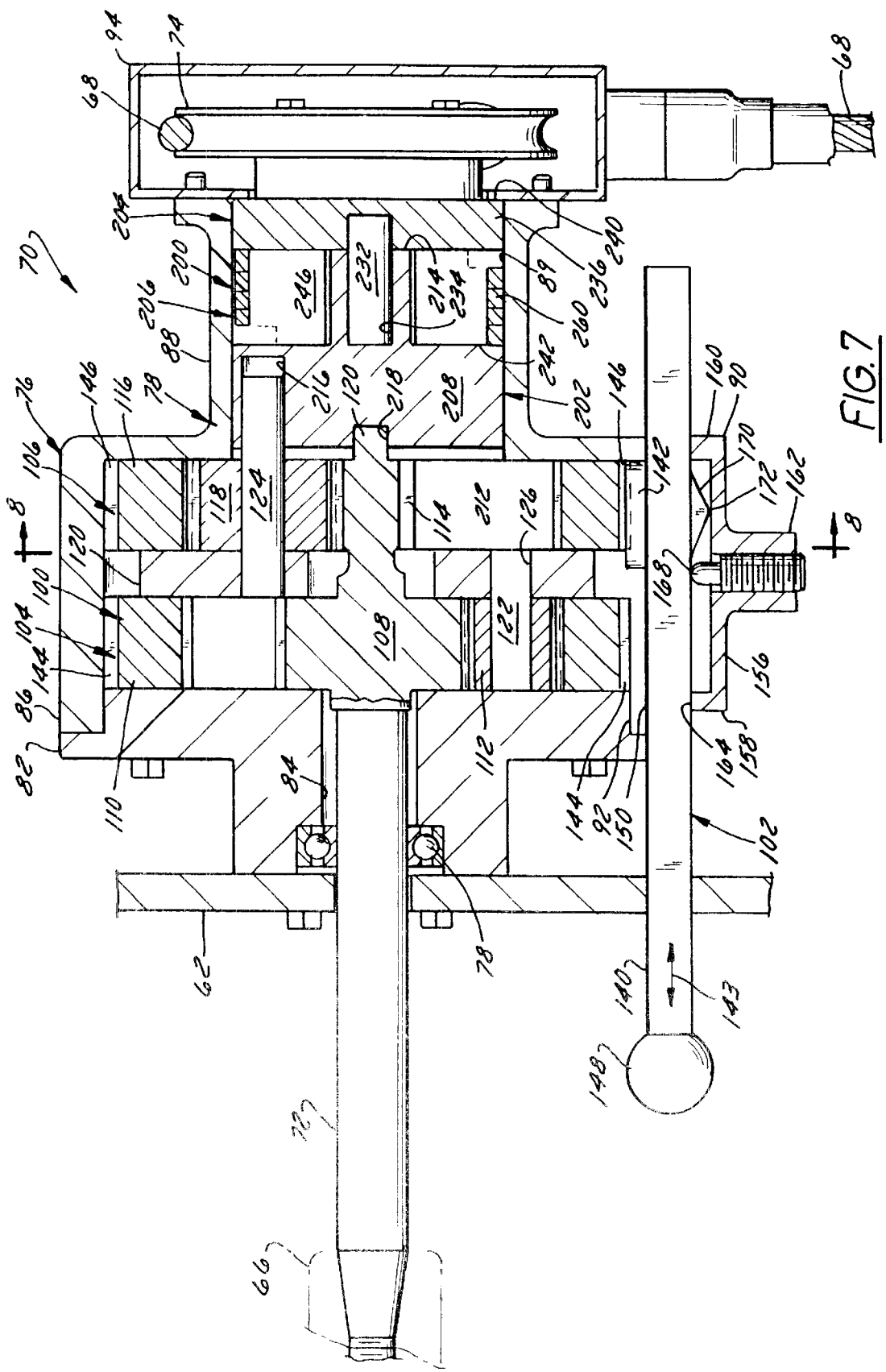
FIG. 7 is a sectional side elevation view of the steering transmission, illustrating the speed changer of the transmission in a second operational position thereof.

A biasing mechanism preferably is included in the guide 90 to bias into the shifter rod 140 into one of its shifted positions while inhibiting retention of the shifter rod 140 in a neutral position between its shifted positions. Referring to FIGS. 5–9, the biasing mechanism of the illustrated embodiment includes a spring-loaded plunger 168 and a detent 170. The plunger 168 extends through the boss 162, through the outer wall 156, and towards the shifter rod 140. The detent 170 protrudes radially from the shifter rod 140 towards the plunger 168. The detent 170 is generally triangular in shape and positioned such that an apex 172 of the detent 170 engages the plunger 168 when the tang 142 is midway between the first and second ring gears 110 and 116. The plunger 168 and the triangular detent 170 cooperate with one another such that shifter rod movement from the first shifted position of FIG. 5 to the second shifted position of FIG. 7 is resisted until the apex 172 of the detent 170 clears the plunger 168, after which the plunger 168 biases the rod 140 further towards the position of FIG. 7. Similar initial resistance to motion and subsequent assistance of motion occur as the rod 140 moves in the opposite direction to shift between the position of FIG. 7 and the position of FIG. 5.

Many different shifters could be used other than the sliding rod type shifter described above. For instance, the shifter could be operated electrically (via a solenoid or the like) or by some other power source rather than manually. Moreover, in order to negate the need to align notches on the ring gears 110 and 116 with a tang or other complimentary element on a shifter, the shifter could take the form of a set of arcuate clamps or shoes, one of which is associated with each ring gear. In this type of system, the operator could select one set of shoes for engagement with the associated ring gear and engage the selected shoes by rotating the lever in the desired direction to drive the shoes into braking engagement with the selected ring gear. The lever could be coupled to the shoes by cam arrangements and appropriate linkages such as dog bone linkages. The cam arrangements would be located out of phase with one another such that rotation of the lever in one direction would actuate one set of shoes to brake one of the ring gears while deactuating the other(s). Conversely, rotation of the lever in the opposite direction would actuate the other set of shoes to brake the other ring gear. A toggle and over/center spring arrangement or similar arrangement could cooperate with the lever to assure that the lever is biased towards and remains in one of its two shifted positions. The shoes associated with each ring gear could engage an outer peripheral surface of the ring gear either directly or via a torque gate of the type described in Section 4 below. In the latter case, the wrapped spring of the torque gate would be compressed into engagement with the selected ring gear upon shoe contraction and move away from the ring gear upon shoe expansion.

The operation of the speed changer 100 will now be detailed. Assuming initially that the shifter rod 140 is in its low speed reduction ratio shift position of FIGS. 5 and 6 in which the tang 142 engages one of the notches 146 in the first ring gear 110, steering forces imposed on the steering wheel 66 generate a steering torque in the steering shaft 72 that is transmitted from the first sun gear 108, to the first set of planet gears 112, to the carrier 120 via the pins 122, and to the torque gate 200 via the pins 124 at a relatively low (e.g., 3:1) speed reduction ratio that is well suited to maximize responsiveness as is desired, e.g. when operating a boat in a harbor or around a dock. Torque is then transferred through the torque gate 200 in a manner detailed below and then to the pulley 74, which transmits steering forces to the pivoting mount 64 via the cable 68. The second ring gear 116 spins freely at this time, thereby effectively disabling the second planetary gear set 106 for torque transfer to the pulley 74. The tang 142 on the shifter rod 140 is maintained in the position illustrated in FIGS. 5 and 6 by the biasing effect of the plunger 168 against the detent 170.

Figure 8:
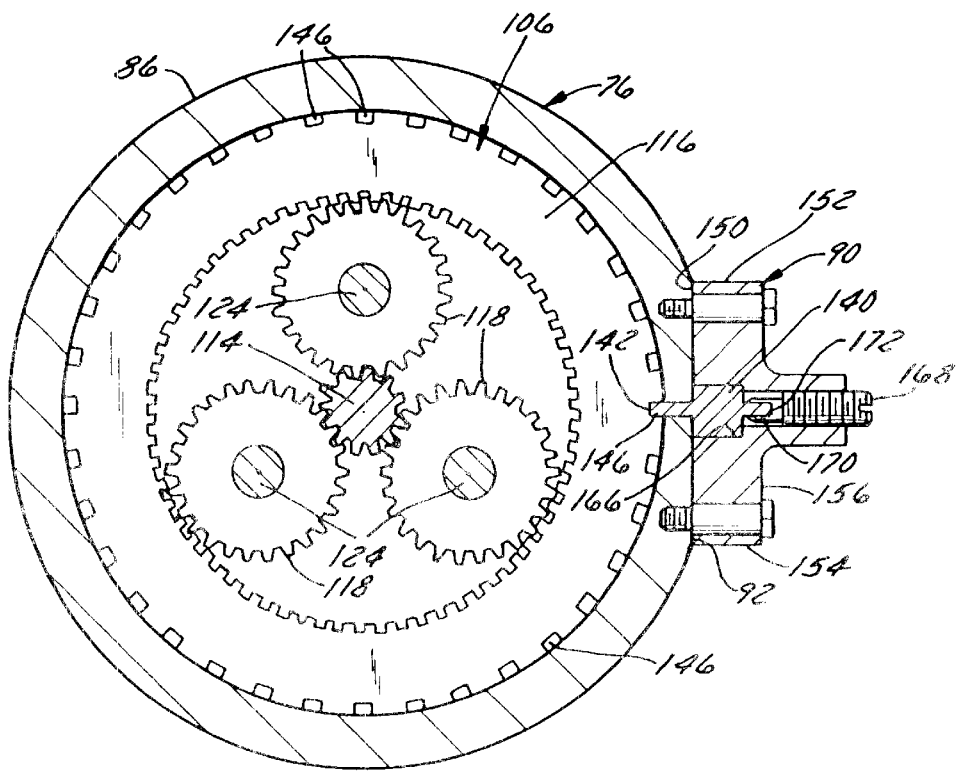
FIG. 8 is a sectional end elevation view taken generally along the lines 8—8 of FIG. 7.

If the operator wants to shift the transmission 70 into its high speed reduction ratio, e.g., for purposes of increasing ease of handling on the open water, he or she simply pushes the shifter rod 140 from the position illustrated in FIGS. 5 and 6 to the position illustrated in FIGS. 7 and 8. The tang 142 disengages from the first ring gear 110 and engages one of the notches 146 in the second ring gear 116, thereby arresting the ring gear 116 from rotation and allowing the ring gear 110 to rotate freely. Shifter rod motion is initially resisted by the plunger 168 until the tang 142 clears the midway point between the gears 110 and 116 and the plunger 168 clears the apex 172 of the detent 170, after which tang movement is assisted by the plunger 168 until the tang 142 is fully seated in a notch 146 of the ring gear 116. The operator therefore is left with a distinct feel that shifting is complete, and the speed changer 100 is held in its shifted position while being restrained from being left in a neutral position between the position of FIG. 5 and the position of FIG. 7. The torque generated by subsequent operation of the steering wheel 66 is transmitted from the shaft 72, through the second sun gear 114, the second set of planet gears 118, and to the torque gate 200 via the pins 124 at a relatively high (e.g., 6½:1) speed reduction ratio. The first ring gear 110 rotates freely at this time, thereby effectively disabling the first planetary gear set 104 for torque transfer.

Shifting may need to be accompanied or preceded by slight movement of the steering wheel 66 in order to align one of the one of the notches 146 on the second ring gear 116 with the tang 142 prior to movement of the tang 142 into that notch. However, because of the relatively high number of notches 144 and 146 on the ring gears 110 and 116 (thirty-six on each ring gear in the illustrated embodiment), little, if any, steering wheel rotation is required. If the shifter were replaced by a rotating lever/shoe type shifter of the type described above, no steering wheel rotation would be required prior to shifting or after shifting to engage the other speed.

4. Description and Operation of Torque Gate

The torque gate 200 is configured to permit substantially unrestricted movement of the steering wheel 66 in both directions while preventing backdrive forces imposed on or by the motor 60 or any other steered mechanism from being transmitted back to the speed changer 100 and the steering wheel 66. The torque gate 200 is also designed to be of a compact, robust, and simple construction so as to permit it to be used in the same relatively small housing 76 as the speed changer 100 while still permitting its use in other applications. It is also designed to provide a smooth release and to be self-energizing.

Referring now to FIGS. 5, 7, and 10–14, the torque gate 200 of the present embodiment is housed in the rear portion 88 of housing 76, but could be housed in a separate housing. The clutch 200 includes a release driver 202, a locking driver 204, and a wrapped spring 206. The release driver 202 is configured for cooperation with the speed changer 100 (or any other rotary input if the torque gate is used in applications lacking the speed changer). The locking driver 204 is configured for rotational coupling to steered mechanism (the driven pulley 74 in the illustrated embodiment). The wrapped spring 206 is located operationally between the release driver 202 and the locking driver 204. The spring 206 is configured to be capable of alternately gripping and releasing a stationary surface depending upon the operational states of the release driver 202 and locking driver 204. Specifically, when the release driver 202 is rotated under the transmission of steering torque from the speed changer 100, the spring 206 releases from the stationary surface sufficiently to permit the release driver 202 to continue to rotate and to drive the locking driver 204 to transfer output torque to the pulley 74 in either the clockwise or counterclockwise direction. Conversely, if the locking driver 204 is driven to rotate under the imposition of backdrive forces generated on or by the motor 60, the spring 206 grips tightly against the stationary surface to prevent additional rotation of the locking driver 204 towards the release driver 202 and, thereby, prevent the locking driver 204 from driving the release driver 202 to rotate. In the illustrated embodiment, the stationary surface comprises the inner peripheral surface 89 of the outer end portion 88 of the housing 76, and the external surface of the spring 206 grips against that surface with a gripping force that increases as the spring attempts to radially expand. The stationary surface could, however, be an outer peripheral surface of a stationary rod or tube, in which case the internal surface of the spring 206 would grip the stationary surface with a force that increases as the spring radially contracts.

Turning now to FIGS. 10 and 11, the release driver 202 comprises a stepped metal shaft having inner and outer axial end portions 208 and 210 terminating at respective inner and outer axial ends 212 and 214. The inner end portion 208 is circular and has a diameter substantially equal to the diameter of the bore in the housing portion 88. The inner axial end 212 has a plurality of axial recesses 216 formed therein for receiving the driven pins 124 of the speed changer 100. It can thus be seen that the release driver 202 always rotates with the pins 124 and, in effect, functions as an extension of the output of the speed changer 100. If the torque gate 200 were to be formed integrally with the speed changer 100 rather than as a semi-modular structure, the pins 124 could be eliminated and the carrier 120 and the release driver 202 could be the same part. Another recess 218 is formed at the center of the inner axial end 212 for receiving and supporting an end 220 of the steering shaft 72. The outer end portion 210 is semi-circular in shape, having a semi-circular surface 222 and a drive surface 224 that is relatively flat, at least at the outer radial portions thereof. The semi-circular surface 222 is of a smaller radius than the radius of inner portion 208 such that, upon clutch assembly, a radial space is formed between the semi-circular surface 222 and the inner peripheral surface 89 of the housing portion 88 for receiving the spring 206 as best seen in FIGS. 5 and 7. Drive lugs 228 and 230 are formed or otherwise provided on the opposite sides of the drive surface 224. The lugs 228 and 230 extend perpendicularly from the drive surface 224 for engagement with a mating drive surface on the locking driver 204 as detailed below. Finally, a centering pin 232 extends axially outwardly from the center of the outer axial end 214 for engagement with a corresponding centering recess 234 in the inner axial end of the release driver 204 to maintain concentricity between the release driver 202 and the locking driver 204 during their operation. The centering pin 232 could be a separate pin as illustrated or could comprise an end portion of shaft 72 if the shaft 72 were to extend completely through the torque gate 200. As an alternative to this construction, and in order to save weight and reduce manufacturing expenses, a substantial portion of the mass of the release driver 202 and locking driver 204 could be eliminated, so long as sufficient structure was retained to perform the various functions described above.

Referring now to FIGS. 10 and 12, the locking driver 204 is, with a few exceptions, a mirror image of the release driver 202. It takes the form of a stepped metal shaft having outer and inner portions 236 and 238 terminating at outer and inner axial ends 240 and 242, respectively. The outer end portion 236 portion of the locking driver 204 is circular. The inner end portion 238 is semi-circular, having a semi-circular surface 244, a flat drive surface 246, and an axial length commensurate with the axial length of outer end portion 210 of the release driver 202. The semi-circular surface 244 has a diameter that matches the diameter of the corresponding surface 222 of the release driver 202. The drive surface 246 faces the drive surface 224 of the release driver 202 with a small circumferential space therebetween. First and second locking lugs 248 and 250 extend radially outwardly from the flat drive surface 246, typically further than the lugs on the release driver 202 so that the spring 206 is robustly loaded. One lug 248 is located at the inner axial end of the drive surface 246, and the other lug 250 is located at the outer axial end of the drive surface 246. The lugs 248 and 250 are configured to engage the associated tangs 262 and 264 of the spring 206 upon locking driver rotation as detailed below. Finally, pulley 74 is bolted to the outer axial end 240.

The inner end portion 238 of the locking driver 204 has a cutout 254 adjacent the outer portion 236. Cutout 254 facilitates clutch assembly by allowing limited sideways motion of the spring 206 relative to the locking driver 204 during clutch assembly, hence permitting the spring 206 to clear the lug 248 during clutch assembly. Then, once the spring 206 clears the lug 248, it can move back to its center position so that the spring's centerline is coaxial with the axis of the locking driver 204.

Referring now to FIGS. 10, 13, and 14, the spring 206 comprises a wrapped spring having 1) a plurality (4½ in the illustrated embodiment) of coils 260 and 2) engagement structures 262 and 264 configured to be engaged by the release and locking drivers 202 and 204. The number of coils 260 could, of course, be varied depending, e.g., on the gripping forces desired in a particular application. The illustrated spring has 4½ coils, resulting in an end change of about 0.03" of an inch in linear motion for a 0.002" change in diameter of the housing portion 88.

One or both of the engagement structures 262 and 264 could comprise notches or other peripheral structures located on or in the spring 206. In the illustrated embodiment, the engagement structures 262 and 264 comprise tangs located on the opposed ends of the spring 206. The tangs 262 and 264 could be mounted on the ends of the spring 206 in any suitable manner. In the illustrated embodiment, they are formed integrally with the spring 206 by bending the ends of the spring 206 radially inwardly from the coils 260, thereby providing generally flat inner and outer faces 266 and 268 on each tang 262 or 264. The inner face 266 of each tang is configured for engagement with the drive surface 224 of the release driver 202. The outer face 268 of each tang is configured for engagement by an associated locking lug 248 or 250 of the locking driver. Rotation of the release driver 202 in either direction causes the flat drive surface 224 to engage the inner face 266 of the associated tang 262 or 264 at a location that is radially offset from the radial centerline of the corresponding end of the spring 206. Conversely, rotation of the locking driver 204 in either direction causes one of the locking lugs 248 or 250 to engage the outer face 268 of the associated tang 262 or 264 at a location that is aligned with the axial end of the corresponding end of the spring 206. The spring 206 is configured in this manner because locking forces are transmitted through the system solely through the spring 206, whereas release forces are transmitted through the spring only after one of the drive lugs 228, 230 of the release driver 202 directly engages the locking driver 204 (steering torques are ultimately transmitted through the clutch 200 by the locking and release drivers 204 and 202 rather than by the spring 206). When the backdrive torque (which causes locking) is in the same direction as the release torque, the drivers may not touch, although release is occurring. This is because the backdrive torque is assisting motion of the release driver. Typically, the drivers 202 and 204 touch one another under these circumstances only if the release driver input torque is delivered faster than the backdrive torque. The spring therefore is subject to much greater loading by the locking driver 204 than by the release driver 202. These higher forces are borne by the entire spring end rather than merely by the cantilevered portion of the tang.

The spring 206 preferably is precompressed so as to be "self-energizing", or to be preloaded against the inner peripheral surface 89 of the housing portion 88. This precompression can be appreciated by comparing FIGS. 13 and 14 to one another. FIG. 14 illustrates that, when the spring 206 in its free state, the tangs 262 and 264 are not radially aligned with one another. The spring 206 is inserted in the housing portion 88 only after compressing it until the tangs 262 and 264 are diametrically opposed from one another as seen FIG. 13. The preloaded spring 206 is then inserted into the housing portion 88 and released, at which time the spring engages the inner peripheral surface 89 of the housing portion 88 with sufficient gripping forces to prevent spring rotation relative to the housing portion 88 in the absence of the imposition of a steering torque from the release driver 202 of sufficient magnitude to overcome the gripping forces imposed by the pressure on the spring. These forces can be of relatively low magnitude because the gripping forces imposed by the preloaded spring are much lower than the locking forces imposed by the gripping torque generated by attempted rotation of the locking driver 204.

Figure 20:
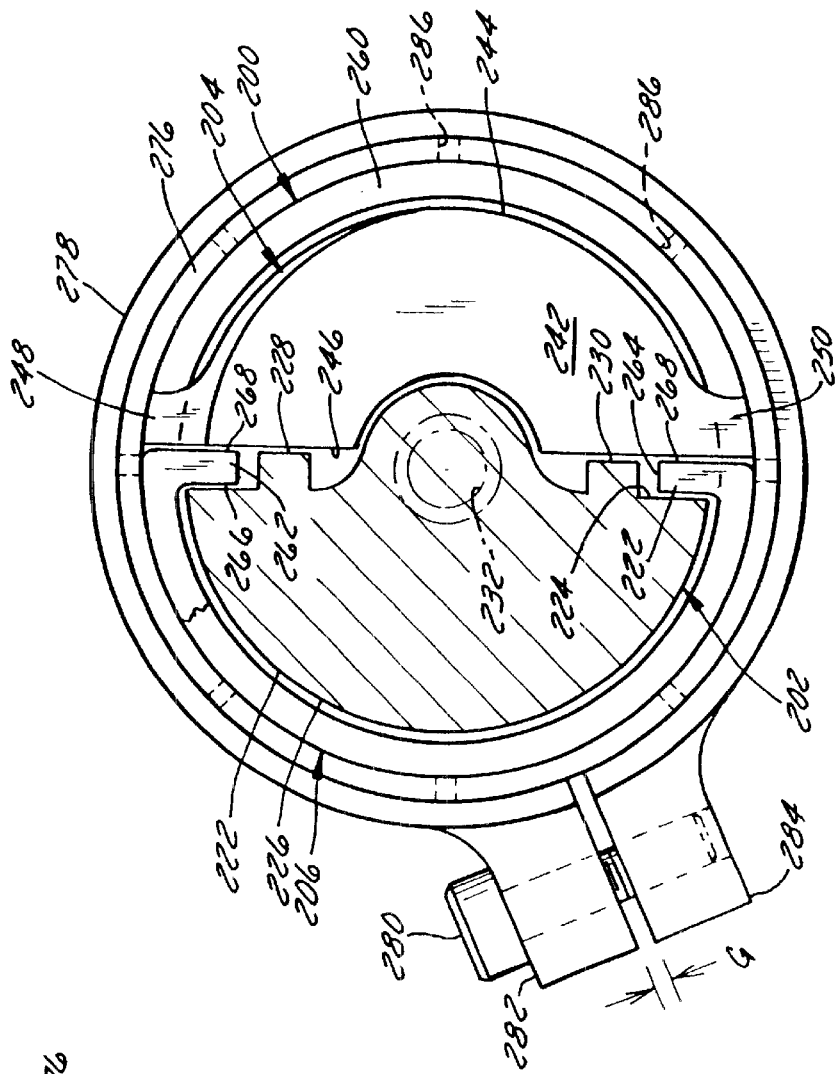
FIG. 20 is a sectional end elevation view of a torque gate constructed in accordance with a second preferred embodiment to the invention.
Figure 21:
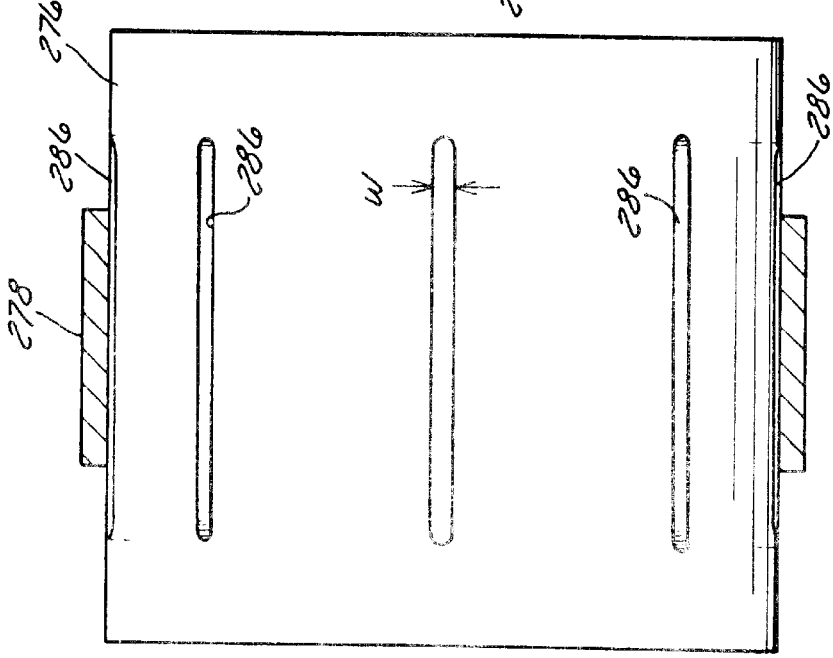
FIG. 21 is a partially cut away side elevation view of the torque gate of FIG. 20.

Setting or maintaining the proper relative spring end positions (i.e., spaced from one another by 180°) and the proper preload of the spring against the housing portion 88 can be facilitated by adjusting the diameter of the housing to set or maintain the desired dimensional relationship between the housing and the spring 206. The diameter of the housing portion 88, or at least that portion of it that surrounds the wrapped spring 206 of the clutch 200, could be adjusted in any of a variety of manners. For instance, the housing 76, or at least portion 88 could be formed from two generally semi circular sections that open and close like a clam shell. It could also be formed from two tubular sections that taper radially and that slide axially relatively to one another. Turning to FIGS. 20 and 21, a diametrically adjustable housing 276 is illustrated. The housing 276 is torsionally stiff but bendable radially to permit diametrical adjustment of the clutch diameter. The housing 276 comprises a simple cylinder, but could comprise an integral part of the transmission housing 76. The housing 276 takes the form of a thin-walled tube, having a thickness of approximately 1/16 of an inch. A band clamp 278 surrounds the tube and can be diametrically adjusted using a bolt 280 extending through mating tangs 282 and 284 on adjacent ends of the band clamp 278. Tightening the bolt 280 reduces the thickness of the gap G between the tangs 282 and 284 and compresses the housing 276 to reduce its diameter, at least in the vicinity of the spring 206. Housing diameter adjustment can, if desired, be facilitated by machining or otherwise forming a plurality of axially extending, circumferentially spaced slits 286 through the housing 276. The width W of the slits 286 decreases upon clamp tightening to facilitate housing compression. Slits 286 are not essential, and could be eliminated in most applications. In this case, the necessary diametrical housing adjustment could be obtained solely through elastic or plastic deformation of the non-slit housing 276.

The operation of the torque gate will now be described.

Figure 15:
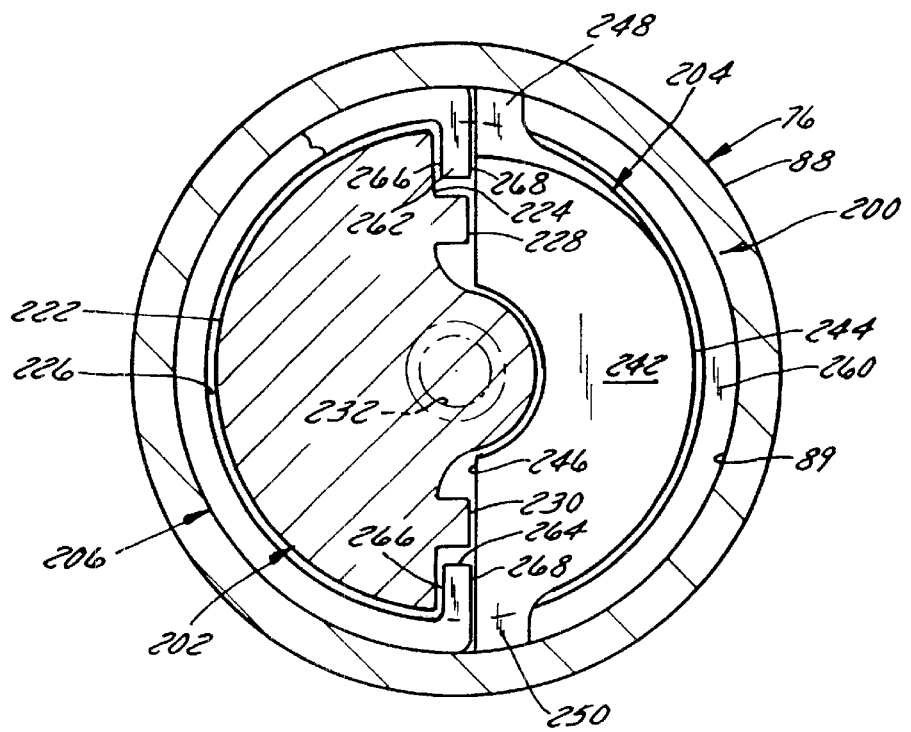
FIG. 15 is a sectional end view of the torque gate of FIG. 10, illustrating the clutch in a neutral operational position thereof.
Figure 16:
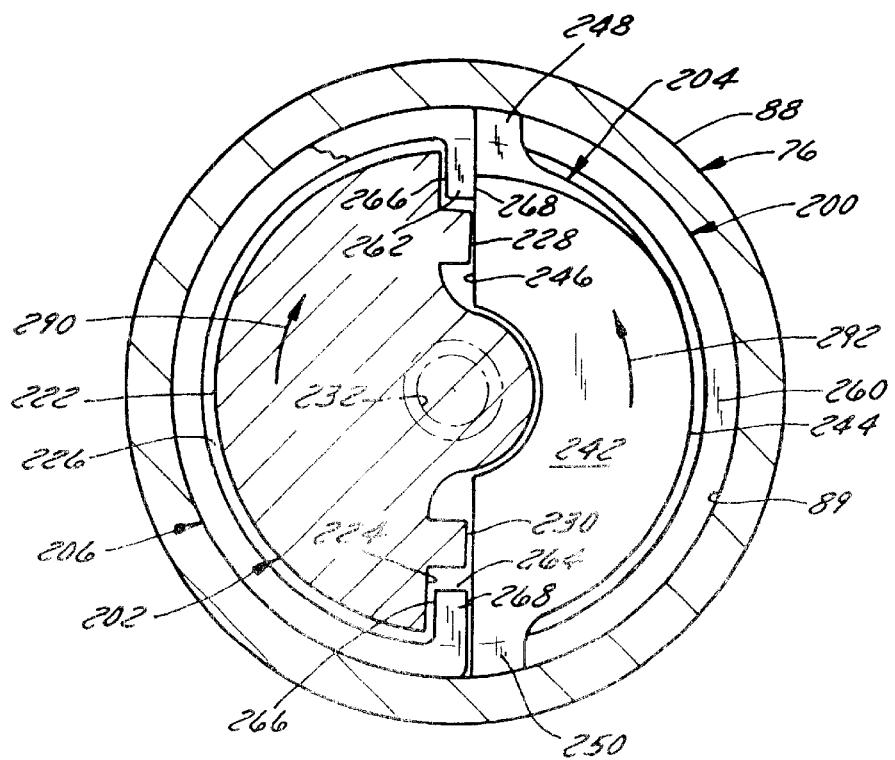
FIG. 16 corresponds to FIG. 15 and illustrates the clutch during an initial phase of an operational state in which a steering torque is transmitted through the clutch against an externally imposed backdrive torque.
Figure 17:
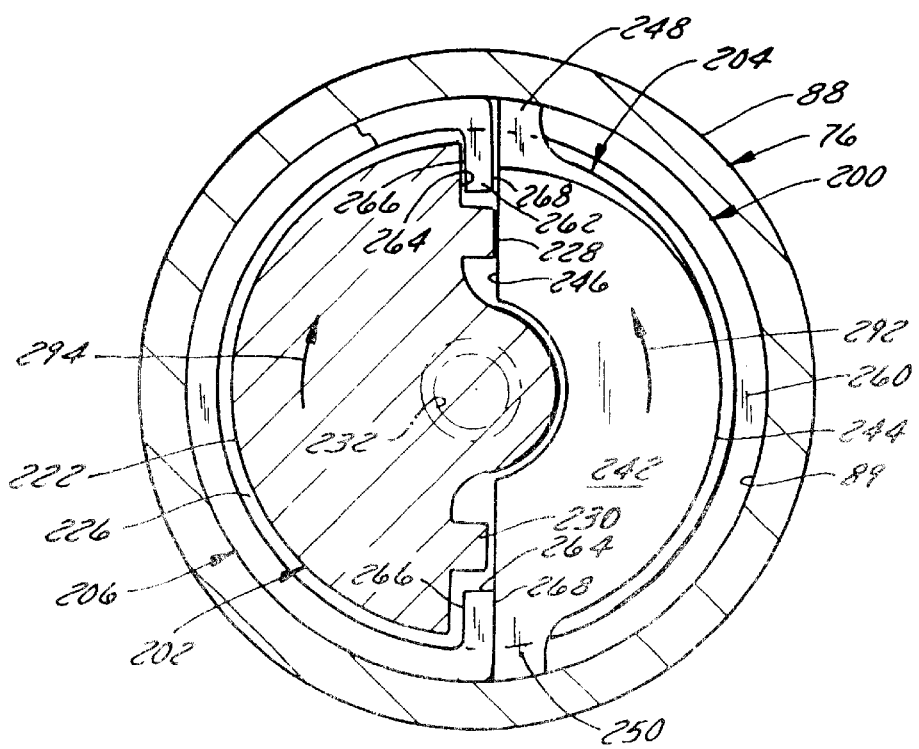
FIG. 17 corresponds to FIG. 16 but illustrates a final or operational phase of the torque gate operation.

In the absence of any torque in either direction, the clutch 200 assumes a neutral position illustrated in FIG. 15, in which the drive surfaces 244 and 246 of the release driver 202 and locking driver 204 may face one another without contacting one another or without contacting the spring 206. The imposition of a clockwise steering force against a counterclockwise reaction force on the release driver (as represented by the arrows 290 and 292 in FIG. 16), causes the drive lugs 228 on the release driver 202 to contact the drive surface 246 on the locking driver 204. Continued rotation of the steering wheel 66 and resultant additional rotation of the release driver 202 causes the release driver 202 to push the locking driver 204 away from the outer face 268 of the tang 262 of the spring 206 and to contact the inner face 266 of the same tang as seen in FIG. 17. Continued steering wheel motion causes the release driver 202 to pull the spring 206 and locking driver 204 around the housing 76 against the relatively light resistance provided by the preload on the spring 206 and by friction between the drivers 202 and 204 and the housing 76. Steering torque is then transmitted to the pulley 74 by the locking driver 204.

Figure 18:
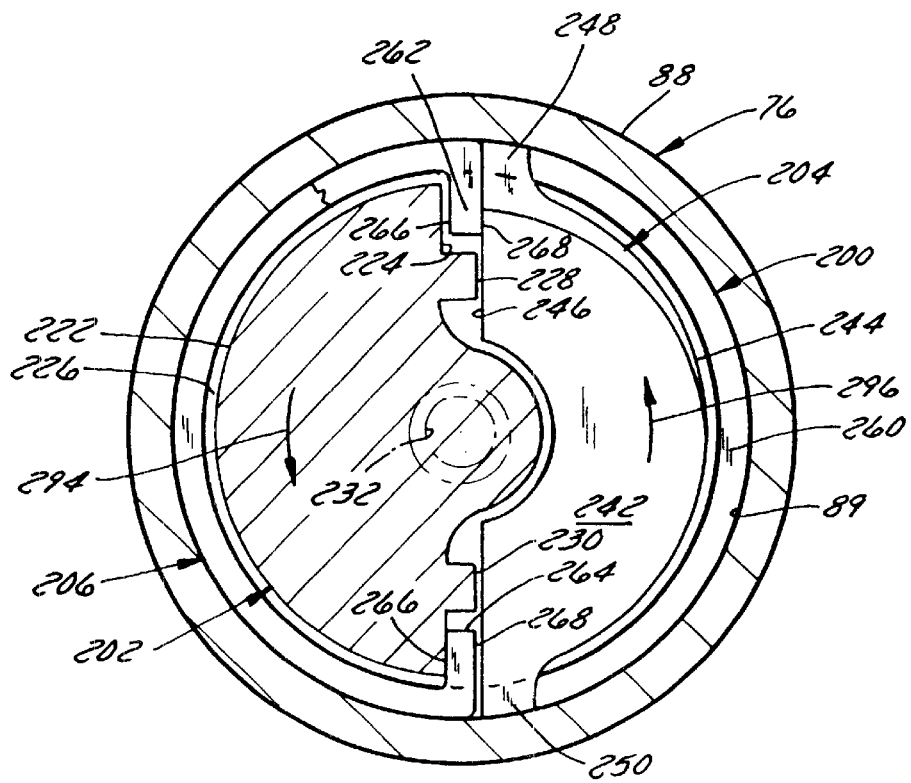
FIG. 18 corresponds to FIG. 15 but illustrates the initial phase of an operational state in which a steering torque is transmitted through the clutch with the assistance of an externally imposed backdrive torque.
Figure 19:
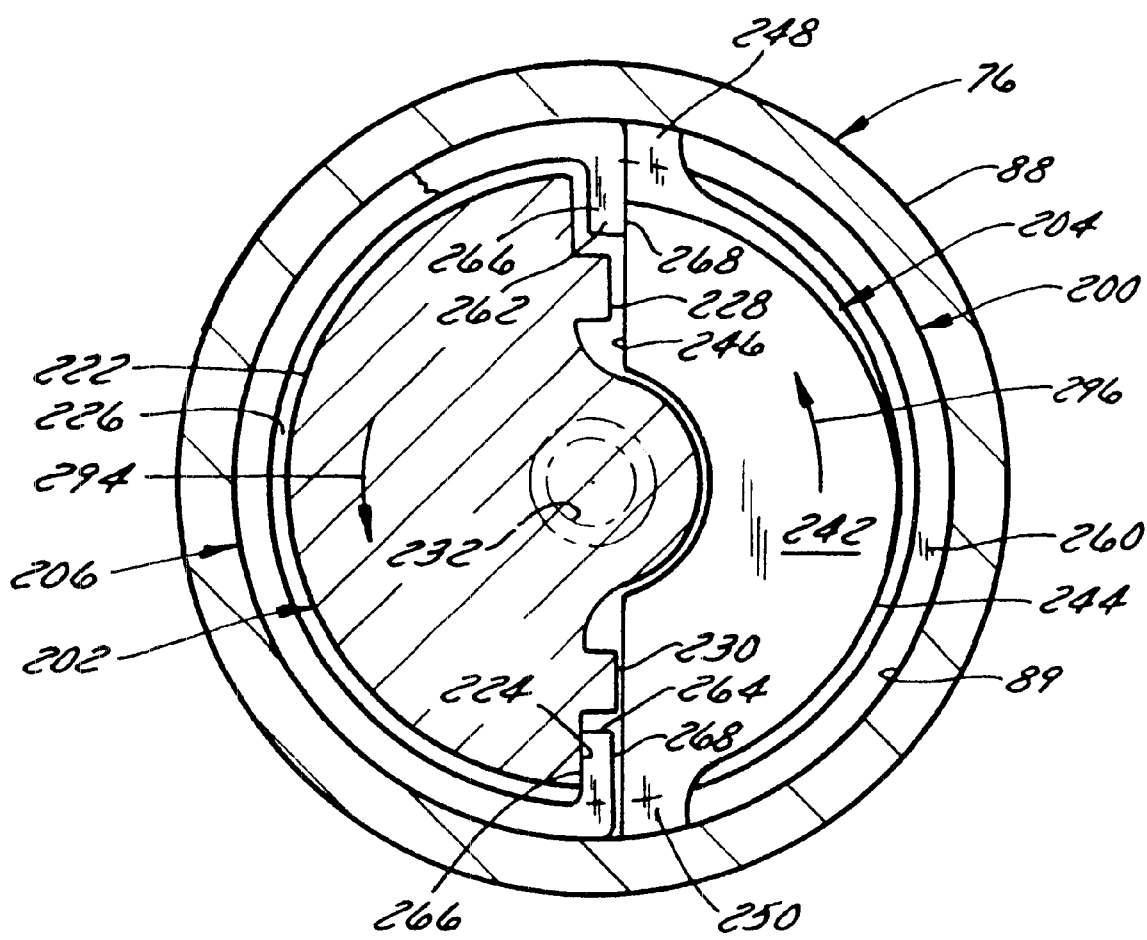
FIG. 19 corresponds to FIG. 18 but illustrates a final or operational phase of the torque gate operation.

Imposition of a steering torque in the same direction as a backdrive torque (counterclockwise in the illustrated embodiment as represented by the arrows 294 and 296) causes the release driver 202 to first engage the inner face 266 of the tang 264 of the spring 206 as seen in FIG. 18, and then to engage the drive surface 246 of the locking driver 204 as seen in FIG. 19 via operation of the drive lug 230. The drive surface 246 of locking driver 204 remains in contact with the outer face 268 of the opposite tang 262 throughout this process. Continued operation of the release driver 202 pulls the spring 206 and locking driver 204 to rotate about the housing to drive the pulley 74 as described above.

FIG. 18 also illustrates the position that the system would obtain in the face of counterclockwise backdrive forces in the absence of any steering force. Additional attempted rotation of the locking driver 204 causes the spring 206 to grip more tightly against the inner peripheral surface 89 of the housing portion 88, thereby preventing any additional rotation of the locking driver 204 relative to the release driver 202 and preventing backdrive forces from being transmitted back through the speed changer 100 to the steering wheel 66. Of course, rotation of either the release driver 202 or the locking driver 204 in the opposite direction from the direction illustrated in the drawings causes the associated driver 202 or 204 to contact the opposite tang of the spring 206. As a result, rotation of the release driver 202 in either direction releases the torque gate 200 to permit the release driver 202 to drive the locking driver 204 and pulley 74 to rotate, and rotation of the locking driver 204 in either direction engages the torque gate 200 to prevent the transmission of backdrive torques to the speed changer 100 and the steering wheel 66.

As should be apparent from the above, the multi-ratio speed changer 100 and torque gate 200 each have benefits of its own and exhibit other, synergistic benefits in combination with one another. For example, the resistance to clutch motion imparted by the drag on the inner peripheral surface 89 of the housing portion 88 by the preloaded spring 206 is reduced by the prevailing gear reduction ratio of the speed changer 100 (either 3:1 or 6½:1 in the illustrated embodiment). The torque gate 200 therefore permits the operator to shift under load without back torque from the steered mechanism interfering with the shifting operation and to steer with minimum (about 1 to 4 ft lb) resistance from the clutch. The combined functionality also fits within the same package envelope of a more traditional mechanical speed changer despite the fact that multiple speed reduction ratios are included in the package.

Many changes and modifications could be made to the invention without departing from the spirit thereof. Some of these changes are discussed above. Other changes will become apparent from the appended claims.

We claim:

1. A steering system comprising:
   (A) a manually operated steering mechanism;
   (B) a steered mechanism; and
   (C) a steering transmission coupling said steering mechanism to said steered mechanism, said steering transmission including
      (1) a multi-ratio speed changer having an input element that is coupled to said steering mechanism, an output element that transmits steering forces to said steered mechanism, and a shifter that is movable between at least first and second shifted positions to release a first rotatable gear of said speed changer and arrest a second rotatable gear of said speed changer from rotation and, thereby, vary a speed change ratio of said speed changer between at least first and second distinct speed change ratios; and
      (2) a torque gate coupling said output element of said speed changer to said steered mechanism so as to permit steering forces to be transmitted to said steered mechanism from said speed changer while preventing backdrive forces from being transmitted to said speed changer from said steered mechanism.

2. The steering system as recited in claim 1,
   wherein said speed changer comprises at least one planetary gear set including a rotatable sun gear, a rotatable planet gear, a rotatable ring gear, and a plurality of rotatable planet gears positioned between said ring gear and said sun gear, wherein at least one of said gears of said planetary gear set is selectively arrestable from rotation upon movement of said shifter into one of said shifted positions thereof in order to alter the speed change ratio of said speed changer.

3. The steering system as recited in claim 2, wherein said ring gear is selectably fixable from rotation upon movement of said shifter into one of said shifted positions thereof.

4. The steering system as recited in claim 1, wherein said steering mechanism is a steering wheel.

5. The steering system as recited in claim 1, wherein said steered mechanism is one of a steered wheel of a wheeled vehicle and a rudder of a marine vessel.

6. A steering system as recited in claim 1, wherein both of said first and second speed change ratios are different from a 1:1 ratio.

7. A steering system as recited in claim 1, wherein all components transferring torque from said input element to said output element remain axially stationary during shifting.

8. A steering system comprising:
(A) a manually operated steering mechanism;
(B) a steered mechanism; and
(C) a steering transmission coupling said steering mechanism to said steered mechanism, said steering transmission including
  (1) a multi-ratio speed changer having an input element that is coupled to said steering mechanism, an output element that transmits steering forces to said steered mechanism, and a shifter that is movable between at least first and second shifted positions to vary a speed change ratio of said speed changer between at least first and second distinct change ratios; and
  (2) a torque gate coupling said output element of said speed changer to said steered mechanism so as to permit steering forces to be transmitted to said steered mechanism from said speed changer while preventing backdrive forces from being transmitted to said speed changer from said steered mechanism, wherein said speed changer includes
    an input shaft coupled to said steering mechanism and forming said input element of said speed changer;
    a first planetary gear set comprising a first sun gear mounted on said input shaft, a first ring gear, and a first plurality of planet gears disposed between said first ring gear and said first sun gear;
    a second planetary gear set comprising a second sun gear mounted on said input shaft, a second ring gear, and a second plurality of planet gears disposed between said second ring gear and said second sun gear, wherein said first and second sun gears are of first and second different diameters; and
    a common carrier for all of said planet gears, said carrier being coupled to an input element of said torque gate and forming at least part of said output element of said speed changer; wherein
      movement of said shifter between said first and second shifted positions selectively arrests one of said first and second ring gears from rotation to select the associated planetary gear set for torque transfer to said driven pin from said input shaft.

9. A steering system comprising:
(A) a manually operated steering mechanism;
(B) a steered mechanism; and
(C) a steering transmission coupling said steering mechanism to said steered mechanism, said steering transmission including
  (1) a multi-ratio speed changer having an input element that is coupled to said steering mechanism, an output element that transmits steering forces to said steered mechanism, and a shifter that is movable between at least first and second shifted positions to vary a speed change ratio of said speed changer between at least first and second distinct change ratios; and
  (2) a torque gate coupling said output element of said speed changer to said steered mechanism so as to permit steering forces to be transmitted to said steered mechanism from said speed changer while preventing backdrive forces from being transmitted to said speed changer from said steered mechanism, wherein said torque gate comprises
    (A) a stationary surface;
    (B) a release driver that is coupled to said output element of said speed changer and that is rotatable relative to said stationary surface;
    (C) a locking driver that is coupled to said steered mechanism and that is rotatable relative to said stationary surface, wherein said release driver and said locking driver have axially-extending drive surfaces that face one another with a circumferential gap therebetween; and
    (D) a wrapped spring that has at least one coil that is disposed adjacent said stationary surface, wherein said spring, said release driver, said locking driver, and said stationary surface are dimensioned and configured relative to one another such that, (1) upon rotation of said release driver in either direction under torsional forces imposed on said torque gate by said speed changer, said spring rotates relative to said stationary surface so as permit rotation of said release driver and said locking driver, thereby permitting torque transfer to said steered mechanism from said output element of said speed changer, and (2), in the absence of the imposition of an overpowering steering forces on said release driver from said speed changer, and upon rotation of said locking driver in either direction under torsional forces imposed on said torque gate by said steered mechanism, said spring locks against said stationary surface so as prevent said drive surface of said locking driver from driving said release driver to rotate, thereby preventing torque transfer to said speed changer from said steered mechanism.

10. The steering system as recited in claim 9, wherein said wrapped spring has (1) first and driver engagement structures, each of which is positioned between the drive surfaces of said release driver and said locking driver, and (2) at least one coil that is disposed adjacent said stationary surface, wherein said release and locking drivers engage said driver engagement structures upon rotation thereof relative to said stationary surface, and wherein said coil engages said stationary surface to lock said spring against said stationary surface when said locking driver engages one of said structures in the absence of an overpowering steering force on said spring from said release driver.

11. The steering system as recited in claim 9, wherein said stationary surface comprises an inner peripheral surface of a housing for said torque gate, and wherein said spring locks against said inner peripheral surface of said housing when said locking driver rotates against one of said driver engagement structures in the absence of the imposition of an overpowering steering force on one of said driver engagement structures by said release driver.

12. An outboard motor steering system comprising:
(A) a speed changer including
  (1) an input shaft configured for rotational coupling to a steering wheel of a boat,
  (2) at least one output element, (3) at least one planetary gear set including a sun gear mounted on said input shaft, a ring gear, and a plurality of planet gears disposed between said sun gear and said ring gear, and (4) a shifter that is manually movable into a shifted position thereof to selectively arrest a component of said planetary gear set from rotation to alter a speed change ratio of said speed changer; and (B) a torque gate including (1) a housing having an inner peripheral surface, (2) a release driver that is located within said housing, that is coupled to said output element of said speed changer, and that is rotatable relative to said housing, (3) a locking driver that is located within said housing, that is configured for rotational coupling to a steered mechanism for a rudder of the boat, and that is rotatable relative to said housing, wherein said release driver and said locking driver have axially-extending drive surfaces that face one another with a circumferential gap therebetween, and (4) a wrapped spring that is located within said housing and that is engageable by both said release driver and said locking driver, wherein said spring, said release driver, said locking driver, and said housing are dimensioned and configured relative to one another such that, (1) upon rotation of said release driver in either direction under torsional forces imposed on said torque gate by said speed changer, said spring rotates relative to said housing so as permit said rotation of said release driver and said locking driver, thereby permitting torque transfer to the steered mechanism from said output element of said speed changer, and (2), in the absence of the imposition of overpowering steering forces on one of said release driver from said speed changer, and upon rotation of said locking driver against said spring in either direction under torsional forces imposed on said torque gate by the steered mechanism, said spring locks against said inner peripheral surface of said housing so as prevent said drive surface of said locking driver from driving said release driver to rotate, thereby preventing torque transfer to said speed changer from the steered mechanism.

13. The steering system as recited in claim 12, wherein movement of said shifter into aid shifted position thereof arrests said ring gear from rotation, thereby altering a change ratio of said speed changer.

14. The steering system as recited in claim 12, wherein said speed changer includes a first planetary gear set comprising a first sun gear mounted on said input shaft, a first ring gear, and a first plurality of planet gears disposed between said first ring gear and said first sun gear;

a second planetary gear set comprising a second sun gear mounted on said input shaft, a second ring gear, and a second plurality of planet gears disposed between said second ring gear and said second sun gear, wherein said first and second sun gears are of first and second different diameters; and a common carrier for all of said planet gears, wherein said carrier is coupled to an input element of said torque gate and forms at least part of said output element of said speed changer; wherein said shifter is manually movable between at least first and second shifted positions to selectively arrest one of said first and second ring gears from rotation to select the associated planetary gear set for torque transfer to said driven pin from said input shaft.

15. The steering system as recited in claim 12, wherein the wrapped spring has (1) first and second tangs, each of that is positioned between the drive surfaces of said release driver and said locking driver, and (2) at least one coil that is disposed adjacent said inner peripheral surface of said housing, wherein said release and locking drivers engage said tangs upon rotation thereof relative to said stationary surface.

16. A multi-ratio speed changer for use in a multi-ratio steering system, said speed changer comprising:

(A) an input shaft configured for rotational coupling to a steering mechanism;

(B) an output element configured to transfer torque to a steered mechanism;

(C) a gearing system having at least one planetary gear set including a sun gear mounted on said input shaft, a ring gear, and a plurality of planet gears disposed between said sun gear and said ring gear; and (D) a shifter that is manually movable from a first shifted position in which said shifter engages a first gear of said gearing system and arrests said first gear from rotation, into a second shifted position thereof to release said first gear and arrest a second gear of said gearing system from rotation to alter a change ratio of said speed changer, said second gear of said gearing system comprising a component of said planetary gear set.

17. The speed changer as recited in claim 16, wherein both of said first and second speed change ratios are different from a 1:1 ratio.

18. The speed changer as recited in claim 16, wherein all components transferring torque from said input element to said output element remain axially stationary during shifting.

19. A multi-ratio speed changer for use in a multi-ratio steering system, said speed changer comprising:

(A) an input shaft configured for rotational coupling to a steering mechanism;

(B) an output element configured to transfer torque to a steered mechanism;

(C) at least one planetary gear set including a sun gear mounted on said input shaft, a ring gear, and a plurality of planet gears disposed between said sun gear and said ring gear; and (D) a shifter that is manually movable into a shifted position thereof to selectively arrest a component of said planetary gear set from rotation to alter a change ratio of said speed changer, wherein said planetary gear set comprises a first planetary gear set comprising a first sun gear mounted on said input shaft, a first ring gear, and a first plurality of planet gears disposed between said first ring gear and said first sun gear, and further comprising a second planetary gear set comprising a second sun gear mounted on said input shaft, a second ring gear, and a second plurality of planet gears disposed between said second ring gear and said second sun gear, wherein said first and second sun gears are of first and second different diameters;

a common carrier for all of said planet gears; and a driven pin forming at least part of said output element of said speed changer; and wherein movement of said shifter is between said first and second shifted positions selectively arrests one of said first and second ring gears from rotation to select the associated planetary gear set for torque transfer to said driven pin from said input shaft.

20. A steering system comprising:

(A) a manually operated steering mechanism;

(B) a steered mechanism; and (C) a steering transmission coupling said steering mechanism to said steered mechanism, said steering transmission including (1) a multi-ratio speed changer having an input element that is coupled to said steering mechanism, an output element that transmits steering forces to said steered mechanism, and a shifter that is movable between at least first and second shifted positions to vary a speed change ratio of said speed changer between at least first and second distinct change ratios; and (2) a torque gate coupling said output element of said speed changer to said steered mechanism so as to permit steering forces to be transmitted to said steered mechanism from said speed changer while preventing backdrive forces from being transmitted to said speed changer from said steered mechanism, wherein said speed changer includes at least first and second planetary gear sets having different, distinct change ratios, and wherein movement of said shifter into a selected one of said shifted positions thereof selects one of said planetary gear sets for the transfer of torque from said steering mechanism to said steered mechanism.

21. The steering system as recited in claim 20, wherein said first planetary gear set has a first sun gear, a first ring gear, and a first plurality of planet gears disposed between said first ring gear and said first sun gear; wherein said second planetary gear set has a second sun gear, a second ring gear, and a second plurality of planet gears disposed between said second ring gear and said second sun gear; wherein said first and second sun gears are of first and second different diameters; and wherein movement said shifter into one of said shifted positions thereof arrests at least one gear of a corresponding one of said first and second planetary gear sets from rotation.

22. A torque gate for use in an anti-feedback steering system, comprising (A) a housing having an inner peripheral surface;

(B) a release driver that is located within said housing, that is configured for coupling to a steering mechanism of the steering system, and that is rotatable relative to said housing, under the imposition of steering forces thereon by the steering mechanism, from a neutral position, through a release position, and into a drive position;

(C) a locking driver that is located within said housing, that is configured for coupling to a steered mechanism of the steering system, and that is rotatable relative to said housing, under the imposition of external forces thereon by the steered mechanism, from a neutral position and to a locking position, wherein said locking driver and said release driver have drive surfaces that overlap one another axially and that are spaced from one another circumferentially; and (D) a wrapped spring that is located within said housing and that is engageable by both said release driver and said locking driver, wherein said spring, said release driver, said locking driver, and said housing are dimensioned and configured relative to one another such that, (1) upon rotation of said release driver through said release position and into said drive position in either direction under torsional forces imposed on said torque gate by the steering mechanism, said spring rotates relative to said housing so as permit rotation of said release driver said locking driver, thereby permitting torque transfer to the steered mechanism, and (2), in the absence of the imposition of overpowering steering forces on said release driver from the steering mechanism, and upon rotation of said locking driver to said locking position thereof in either direction under torsional forces imposed on said torque gate by the steered mechanism, said locking driver engages said spring so as to cause said spring to lock against said inner peripheral surface of said housing so as to prevent said locking driver from driving said release driver to rotate, thereby preventing torque transfer to the steering mechanism from the steered mechanism.

23. The torque gate as recited in claim 22, wherein the wrapped spring has (1) first and second driver engagement structures, each of which is positioned between the drive surfaces of said release driver and said locking driver, and (2) at least one coil that is disposed adjacent said inner peripheral surface of said housing, wherein said release and locking drivers engage said driver engagement structures upon rotation thereof relative to said inner peripheral surface of said housing.

24. The torque gate as recited in claim 23, wherein said driver engagements structures comprise tangs on opposed ends of said spring.

25. The torque gate as recited in claim 24, wherein, when said locking driver is in said locking position thereof, said locking driver engages an outer face of one of said tangs, said outer face being radially aligned with an axial end of an adjacent coil of said spring.

26. The torque gate as recited in claim 24, wherein, when said release driver is in said release position thereof, said release driver engages an inner face of one of said tangs that is radially offset from an axial end of an adjacent coil of said spring.

27. The torque gate as recited in claim 24, wherein said drive surfaces comprise flat, axially extending surfaces, and wherein engagement lugs are formed on at least one of the drive surfaces that engages the other drive surface upon rotation of said release driver past said spring release position thereof and into said driving position thereof.

28. A torque gate for use in an anti-feedback steering system, comprising (A) a housing having an inner peripheral surface;

(B) a release driver that is located within said housing, that is configured for coupling to a steering mechanism of the steering system, and that is rotatable relative to said housing, under the imposition of steering forces by the steering mechanism, from a neutral position, through a release position, and into a drive position;

(C) a locking driver that is located within said housing, that is configured for coupling to a steered mechanism of the steering system, and that is rotatable relative to said housing, under the imposition of external forces by the steered mechanism, from a neutral position to a locking position, wherein said locking driver and release driver have drive surfaces that overlap one another axially and that are spaced from one another circumferentially; and (D) a wrapped spring that is located within said housing and that is engageable by both said release driver and said locking driver, said wrapped spring including at least one coil that at least selectively engages an inner peripheral surface of said housing, and wherein a diameter of said housing is adjustable to maintain a desired positional relationship between said coil of said spring and said inner peripheral surface of said housing.

29. The torque gate as recited in claim 28, wherein at least a portion of said housing that surrounds said coil is torsionally relatively rigid but diametrically adjustable, and further comprising a clamp that engages said portion of said housing and that can be selectively tightened to adjust the diameter of said portion of said housing.

30. A steering transmission comprising:

(A) a housing having front and rear ends;

(B) a drive shaft journaled in and extending forwardly from said front end of said housing, said drive shaft being configured for connection to a steering mechanism;

(C) a multi-ratio speed changer that is disposed in said housing and that is driven by said shaft, said speed changer including a shifter that is movable between at least first and second shifted positions to disengage a first gear of said speed changer and engage a second gear of said speed changer and, thereby, vary a speed change ratio of said speed changer between at least first and second distinct speed change ratios; and (D) a torque gate that is disposed in said housing between said speed changer and said rear end of said housing, said torque gate including an input element coupled to said speed changer and an output element configured for coupling to a steered mechanism.

31. The steering transmission as recited in claim 30, wherein said housing is less than 12" long.

32. The steering transmission as recited in claim 30, wherein said housing is less than 8" long.

33. A steering transmission comprising:

(A) a housing having front and rear ends;

(B) a drive shaft journaled in and extending forwardly from said front end of said housing, said drive shaft being configured for connection to a steering mechanism;

(C) a multi-ratio speed changer that is disposed in said housing and that is driven by said shaft, said speed changer including a shifter that is movable between at least first and second shifted positions vary a speed change ratio of said speed changer between at least first and second distinct speed change ratios; and (D) a torque gate that is disposed in said housing between said speed changer and said rear end of said housing, said torque gate including an input element coupled to said speed changer and an output element configured for coupling to a steered mechanism, wherein said torque gate comprises a spring that engages an inner peripheral surface of said housing, and wherein a diameter of said housing is adjustable to maintain a desired positional relationship between said spring and said inner peripheral surface of said housing.

34. A method comprising:

(A) imposing a steering force on a steering mechanism;

(B) transmitting said steering force to a rotary speed changer at a first rotational velocity;

(C) transmitting said steering force from said speed changer to a torque gate at a second rotational velocity, a ratio between said first and second rotational velocities being determined by a speed change ratio of said speed changer;

(D) transmitting said steering force to a steered mechanism from said torque gate;

(E) shifting said speed changer to alter said speed change ratio, the shifting step comprising moving a shifter 1) from a first shifted position arresting a first rotatable gear of said speed changer from rotation and permitting a second rotatable gear of said speed changer to rotate 2) to a second shifted position arresting said second gear of said speed changer from rotation and permitting said first gear of said speed changer to rotate; and (F) preventing forces imposed on or by said steering mechanism from being transmitted back to said speed changer through said torque gate.

35. The method as recited in claim 34, wherein said speed change ratio and said altered speed change ratio are constant for all operational positions of said steering mechanism.

36. The method as recited in claim 34, wherein the steps (B) and (C) comprise transmitting torque from an input shaft of said speed changer, through at least one planetary gear set of said speed changer, and to an output element of said speed changer, and wherein the shifting step comprises arresting rotation of at least one component of said planetary gear set.

37. The method as recited in claim 36, wherein the steps (B) and (C) comprise transmitting torque from an input shaft of said speed changer, through one of a plurality of planetary gear sets of said speed changer, and to an output element of said speed changer, and wherein the step (E) comprises disabling one of said planetary gear sets for torque transfer and enabling another of said planetary gear sets for torque transfer.

38. The method as recited in claim 37, wherein the step (E) comprises releasing a gear of said one planetary gear set for rotation and arresting a gear of said another planetary gear set from rotation.

39. The method as recited in claim 34, wherein said shifting step comprises shifting between a first speed reduction ratio of less than 4:1 to a second speed reduction ratio of more than 4:1.

40. The method as recited in claim 34, wherein said shifting step comprises shifting between a first speed reduction ratio of no more than about 3:1 to a second speed reduction ratio of no less than about 6:1.

41. A method comprising:

(A) imposing a steering force on a steering mechanism;

(B) transmitting said steering force to a rotary speed changer at a first rotational velocity;

(C) transmitting said steering force from said speed changer to a torque gate at a second rotational velocity, a ratio between said first and second rotational velocities being determined by a speed change ratio of said speed changer;

(D) transmitting said steering force to a steered mechanism from said torque gate;

(E) shifting said speed changer to alter said speed change ratio; and (F) preventing forces imposed on or by said steering mechanism from being transmitted back to said speed changer through said torque gate, wherein the step (D) comprises transmitting torque from a rotatable release driver of said torque gate, to a rotatable locking driver of said torque gate, and to a rotatable member coupled to said steered mechanism, and wherein the step (F) comprises rotating a locking driver of said torque gate into contact with a wrapped spring of said torque gate to cause said wrapped spring to lock against a stationary surface of said torque gate and prevent additional rotation of said locking driver relative to said stationary surface.

42. The method as recited in claim 41, wherein the step (D) comprises rotating said release driver from a neutral position, through a spring-release position in which said release driver engages said spring and drives said spring to rotate relative to said stationary surface, and to a driving position in which said release driver drives said locking driver to rotate.

43. A multi-ratio speed changer for use in a multi-ratio steering system, said speed changer comprising:

(A) an input shaft configured for rotational coupling to a steering mechanism;

(B) an output element configured to transfer torque to a steered mechanism;

(C) at least one planetary gear set including a sun gear mounted on said input shaft, a ring gear, and a plurality of planet gears disposed between said sun gear and said ring gear; and (D) a shifter that is manually movable into a shifted position thereof to selectively arrest a component of said planetary gear set from rotation to alter a change ratio of said speed changer, wherein said shifter comprises a rod that is movable axially relative to said input shaft and a stop that is mounted on said rod and that engages a ring gear when said shifter is in said shifted position thereof to arrest said ring gear from rotation.

44. The speed changer as recited in claim 43, wherein said stop comprises a tang that engages a mating notch in said ring gear.

45. The speed changer as recited in claim 43, wherein said shifter further comprises a guide that slidably supports said rod, a spring-loaded plunger mounted on one of said guide and said rod, and a detent that is mounted on the other of said spring-loaded plunger and said rod and that cooperates with said plunger to bias said rod between first and second shifted positions thereof while inhibiting retention of said rod in a neutral position between said first and second positions.

46. The speed changer as recited in claim 45, wherein said detent comprises a generally triangular protrusion on an outer peripheral surface of said rod.

47. A steering system comprising:

(A) a manually operated steering mechanism;

(B) a steered mechanism; and (C) a steering transmission coupling said steering mechanism to said steered mechanism, said steering transmission including (1) a multi-ratio speed changer having an input element that is coupled to said steering mechanism, an output element that transmits steering forces to said steered mechanism, and a shifter that is movable between at least first and second shifted positions to vary a speed change ratio of said speed changer between at least first and second distinct speed change ratios, both of said speed change ratios being different than 1:1; and (2) a torque gate coupling said output element of said speed changer to said steered mechanism so as to permit steering forces to be transmitted to said steered mechanism from said speed changer while preventing backdrive forces from being transmitted to said speed changer from said steered mechanism.

* * * * *